United States Patent
Ishihara et al.

(10) Patent No.: US 7,075,615 B2
(45) Date of Patent: Jul. 11, 2006

(54) LIGHT SEPARATION DEVICE, BLAZED GRATING DEVICE, DIFFRACTION GRATING DEVICE, AND ILLUMINATION OPTICAL SYSTEM

(75) Inventors: Jun Ishihara, Kobe (JP); Kohtaro Hayashi, Toyonaka (JP); Yuichiro Ori, Moriyama (JP)

(73) Assignee: Minolta Co., Ltd., Osaka (JP)

( * ) Notice: Subject to any disclaimer, the term of this patent is extended or adjusted under 35 U.S.C. 154(b) by 247 days.

(21) Appl. No.: 10/845,421

(22) Filed: May 13, 2004

(65) Prior Publication Data

US 2005/0001975 A1 Jan. 6, 2005

Related U.S. Application Data

(62) Division of application No. 09/843,661, filed on Apr. 26, 2001.

(30) Foreign Application Priority Data

| Apr. 28, 2000 | (JP) | 2000-130741 |
| Jun. 20, 2000 | (JP) | 2000-184299 |
| Jun. 30, 2000 | (JP) | 2000-197942 |

(51) Int. Cl.
  G02F 1/13 (2006.01)
  G02F 1/1335 (2006.01)
  G02B 5/30 (2006.01)
  G02B 5/18 (2006.01)

(52) U.S. Cl. ............... 349/201; 349/202; 349/96; 359/573; 359/494

(58) Field of Classification Search ............ 349/201, 349/202, 96, 9, 5; 359/494, 325, 288
See application file for complete search history.

(56) References Cited

U.S. PATENT DOCUMENTS

| 4,729,640 A | * | 3/1988 | Sakata ............... 349/201 |
| 5,552,916 A | | 9/1996 | O'Callaghan et al. ...... 359/95 |
| 5,615,029 A | | 3/1997 | Moddel et al. .......... 349/84 |
| 5,900,977 A | | 5/1999 | Hikmet ............... 359/497 |
| 5,930,044 A | * | 7/1999 | Schleipen ............. 359/573 |
| 6,020,944 A | * | 2/2000 | Hoshi ................ 349/62 |
| 6,102,545 A | | 8/2000 | Ogino ................ 353/38 |
| 6,118,586 A | | 9/2000 | Tanabe et al. .......... 359/566 |
| 6,118,589 A | * | 9/2000 | Angelo et al. .......... 359/621 |
| 6,147,802 A | | 11/2000 | Itoh et al. ............ 359/500 |
| 6,278,552 B1 | * | 8/2001 | Ishihara et al. ......... 359/619 |
| 6,424,436 B1 | | 7/2002 | Yamanaka ............. 359/15 |

FOREIGN PATENT DOCUMENTS

| JP | 10-197827 A | | 7/1998 |
| JP | 10-197827 | * | 7/1998 |

* cited by examiner

Primary Examiner—Tarifur R. Chowdhury
Assistant Examiner—Mike Qi
(74) Attorney, Agent, or Firm—Sidley Austin Brown & Wood LLP

(57) ABSTRACT

A thin and light optical device satisfactorily separates light components having different properties. A blazed grating is formed on a surface of a flat-plate-shaped transparent substrate, and a separation coating that reflects or transmits incident light according to the properties of the incident light is provided on the blazed grating. The thus obtained optical device offers a function of separating light into reflected light and transmitted light, and also has a function of diffracting or refracting the thus separated light. As the separation coating, a polarization separation film, dichroic film, angle separation film, or chiral nematic liquid crystal layer is used to separate linearly polarized light components having different polarization planes, light components having different wavelengths, light components incident at different angles of incidence, or circularly polarized light components having different rotation directions.

7 Claims, 26 Drawing Sheets

LIGHT SEPARATION DEVICE, BLAZED GRATING DEVICE, DIFFRACTION GRATING DEVICE, AND ILLUMINATION OPTICAL SYSTEM

This application is a divisional application of copending application Ser. No. 09/843,661. filed Apr. 26, 2001, which is based on Japanese Patent Application No. 2000-130741 filed Apr. 28, 2000, No. 2000-184229 filed on Jun. 20, 2000, and No. 2000-197942 filed on Jun. 30, 2000, the contents of which are hereby incorporated by reference.

BACKGROUND OF THE INVENTION

1. Field of the Invention

The present invention relates to a blazed grating device and to a diffraction grating device, and particularly to a light separation device that separates light according to the properties of the light. The present invention also relates to an illumination optical system provided with such a blazed grating device, diffraction grating device, or light separation device.

2. Description of the Prior Art

In an image display apparatus that modulates illumination light with a spatial modulation device so that the modulated light represents an image, various kinds of optical devices are used to direct the illumination light to the spatial modulation device. In cases where a liquid crystal display (LCD) is used as a spatial modulation device, the LCD needs to be fed with linearly polarized light that is polarized uniformly on a fixed polarization plane (i.e. the plane on which electrical vectors vibrate). For this reason, when a light source that emits unpolarized light is used, a polarization separation (PBS) prism or polarizing plate is used together to extract linearly polarized light that suits the LCD.

FIG. 45 shows the structure of a PBS prism. A PBS prism is composed of a PBS film 151c sandwiched between two prism elements 151a and 151b, each having the shape of a rectangular equilateral triangle in cross section. The PBS film 151c separates P-polarized and S-polarized light components by selectively transmitting one and reflecting the other. However, in general, at angles of incidence smaller than about 45°, the PBS film 151c does not exhibit sufficient selectivity between transmission and reflection, and thus does not offer satisfactory separation. This is the reason that a PBS film 151c is usually sandwiched between two prism elements 151a and 151b so as to be used in the form of a PBS prism having the shape of a square prism.

Simply separating differently polarized light components as achieved with a PBS prism, or simply absorbing an unnecessary linearly polarized light component with a polarizing plate, results in the loss of about half of the illumination light fed from a light source. To avoid this, it is customary to integrate together the two linearly polarized light components obtained as a result of polarization separation by rotating the polarization plane of one light component through 90° with a half-wave plate so that the polarization plate of this light component coincides with that of the other (for example, as disclosed in Japanese Patent Application Laid-Open No. H10-197827). Performing polarization conversion in this way helps almost eliminate the loss of illumination light, and thus makes it possible to illuminate a spatial modulation device with high light use efficiency.

In cases where a reflective LCD is used, since the optical path of the illumination light that illuminates the LCD coincides with the optical path of the light reflected from the LCD, it is necessary to separate the illumination light beam and the reflected light beam, of which the latter represents an image, somewhere in their optical paths. To achieve this, an optical device that reflects one and transmits the other of the illumination and reflected light beams is used.

A PBS prism as described above is used for this purpose also. In cases where a reflective LCD is used in such a way that the light that has its polarization plane rotated through 90° by being modulated by the LCD represents an image, if the light transmitted through a PBS prism is used as illumination light, the light that represents the image is reflected from the PBS prism; alternatively, if the light reflected from the PBS prism is used as illumination light, the light that represents the image is transmitted through the PBS prism. In either case, it is possible to direct the reflected light, which represents the image, in a direction different from the direction leading to the light source.

FIG. 46 shows another optical device used to separate illumination light and reflected light. This optical device has a large number of grooves 152d, each having a V-shaped cross section, formed in the top surface 152a of a transparent flat plate 152, and is arranged with its bottom surface 152b facing a reflective LCD 153. The light fed from a light source is introduced into the flat plate 152 through an end surface 152c thereof, and then travels inside the flat plate 152 by being totally reflected from the top and bottom surfaces 152a and 152b. Meanwhile, the light strikes the surfaces of the grooves 152d and is reflected therefrom. As a result, the light is then transmitted through the bottom surface 152b, and then illuminates the LCD 153. The light reflected from the LCD 153 enters the flat plate 152 through the bottom surface 152b, and then exits from the flat plate 152 by being transmitted through the top surface 152a.

Between the flat plate 152 and the LCD 153, a polarizing plate 154 is disposed to form the illumination light into linearly polarized light. The LCD 153 is so controlled that, not the linearly polarized light component that has its polarization plane rotated through 90° by being modulated, but the linearly polarized light component of which the polarization plane has not been rotated by modulation is used as light representing an image.

One conventional way to display color images is to provide each pixel of an LCD with a color filter that selectively transmits red (R), green (G), or blue (B) light. However, in this arrangement, two-thirds of the white light fed from a light source is lost by the color filters, which results in low light use efficiency. To avoid this, in recent years, it has been becoming increasingly common to separate illumination light into R, G, and B light components that travel along slightly different optical paths and provide an LCD with a microlens array so that the R, G, and B light components strike different pixels.

FIG. 47 shows an optical system used to separate colors by this method. This optical system is composed of three dichroic mirrors 155R, 155G, and 155B. The dichroic mirrors 155R, 155G, and 155B selectively reflect R, G, and B light components, respectively, and transmit the light components of the other colors. The dichroic mirrors 155R, 155G, and 155B are arranged at an angle to one another so as to reflect the light incident thereon in different directions. The differences between the angles at which the reflected R, G, and B light components travel are twice as great as the differences between the angles at which the dichroic mirrors 155R, 155G, and 155B are arranged.

As shown in FIG. 48, the LCD 153 is provided with a microlens array 156 that is so arranged that each of the microlenses 156a constituting it faces three adjacent pixels 153R, 153G, and 153B. Each microlens 156a receives the R, G, and B light components from different directions and makes them converge on different pixels 153R, 153G, and 153B. In this way, it is possible to direct the whole light fed from the light source to the pixels of the LCD 153, and thereby obtain bright images.

A device called a digital micromirror device (DMD) having a large number of mirror elements arranged in a two-dimensional array is also used as a spatial modulation device. In a DMD, the angle of each mirror element is variable so that, according to this angle, the light incident thereon is reflected selectively in one of two predetermined directions. Of the light thus reflected in two directions by the DMD, the portion reflected in one direction is extracted as light representing an image, and the portion reflected in the other direction is discarded as unnecessary light.

FIG. 49 shows a typical optical system used to illuminate a DMD. This optical system is composed of two prisms 157a and 157b arranged with a minute gap between them. The light fed from a light source is introduced into the prism 157a from the side. The surface 157c of the prism 157a that faces the prism 157b is so formed that the introduced light strikes it at an angle of incidence grater than the critical angle, and therefore the introduced light is totally reflected from the surface 157c. As a result, the light is then transmitted through the surface 157d, and then illuminates the DMD 158. The light reflected from the DMD 158 enters the prism 157a through the surface 157d. The light that has entered the prism 157a reaches the surface 157c at an angle of incidence smaller than the critical angle, and is thus transmitted therethrough. The light is then transmitted through the prism 157b. In this way, an optical system used to illuminate a DMD exploits total reflection on and transmission through prism surfaces.

A polarizing plate is easy to use because it has a simple structure and has the shape of a flat plate. However, the transmittance that a polarizing plate exhibits to the linearly polarized light component that is transmitted therethrough is about 80% at best. This causes loss of light. Moreover, a polarizing plate absorbs all light components other than the linearly polarized light component that is transmitted therethrough. This makes the polarizing plate hot and thereby affects the other devices arranged nearby such as an LCD. When intense light is used to obtain bright images, the polarizing plate becomes particularly hot.

A PBS prism does not absorb light, and therefore does not become hot. Moreover, a PBS prism permits the use of both the light transmitted therethrough and the light reflected therefrom. Moreover, a PBS prism can easily be made to offer a transmittance or reflectance of substantially 100%, and thus excels in light use efficiency. However, a PBS prism has a thickness that is equal to the width of the entrance surface thereof, and thus makes the display apparatus that incorporates it larger and heavier. In a display apparatus of a projection type that forms an image on a screen by projecting light representing the image onto the screen, using a PBS prism makes the back focal length of the projection optical system longer, and therefore a large projection optical system is required to obtain bright images. This problem of making display apparatuses larger and heavier also applies to the optical system shown in FIG. 49, which, too, uses prisms.

The optical device shown in FIG. 46 is easy to use because it has a simple structure and can be produced simply by forming grooves in a flat plate. However, part of the light that has entered the flat plate by being reflected from an LCD is reflected from the surfaces of the grooves, and thus cannot be transmitted through the flat plate. As a result, dim stripes appear in the displayed image. Such dim stripes can be made less conspicuous to a certain degree by making the width of the grooves narrower, but there is no fundamental remedy for this problem.

The optical system shown in FIG. 47, composed of three dichroic mirrors, excels in light use efficiency. However, those dichroic mirrors are separate devices, and therefore it is difficult to arrange them at correct angles to one another. Thus, assembling the optical system requires a long time and lowers the overall manufacturing efficiency.

Diffractive optical devices are used in various fields of optics. A diffractive optical device has a grating surface with microstructures formed thereon that consist of minute projections and depressions arranged in a periodic pattern, and deflects light by diffraction. Diffractive optical devices are grouped into a bi-level type having projections and depressions, both with flat surfaces, respectively formed at two different levels (heights), a multi-level type having one or more intermediate levels between such projections and depressions, and a blazed type having slanted surfaces so as to have a sawtooth-shaped section. Diffractive optical devices of any of these types may be of a transmission type that diffracts the light that is transmitted therethrough, or of a reflection type that has its grating surface coated with a reflective film so as to diffract the light that is reflected therefrom. Transmission-type diffractive optical devices often have their grating surface coated with an anti-reflection film to obtain higher transmittance.

Though not a diffractive optical device, a Fresnel lens also has a large number of minute slanted surfaces, and is thus formed as a blazed device having a sawtooth-shaped section. In diffractive optical devices, the difference between the levels of projections and depressions is about equal to the wavelength of light, so that light is diffracted. By contrast, in Fresnel lenses, the difference between the levels of projections and depressions is several times or more as great as the wavelength of light, so that light is deflected exclusively by refraction.

Diffractive optical devices and Fresnel lenses have the great advantage of being thin optical devices.

According to the Japanese Patent Application Laid-Open No. H10-197827 mentioned previously, a polarization separation device is built as a diffraction grating formed out of an isotropic transparent material, and an optically anisotropic layer formed out of a birefringent material, and the like. However, even when a diffraction grating is formed out of an isotropic transparent material, unless due consideration is given to the thickness of the diffraction grating, the diffraction grating may exhibit birefringence, of which the effect can lower light use efficiency. Moreover, diffraction gratings are optical components having microstructures, and therefore it is difficult to achieve high reliability in a diffraction grating by forming it as a single member. In addition, diffraction gratings are required to be easy to produce in terms of their moldability.

SUMMARY OF THE INVENTION

An object of the present invention is to provide an optical device that, despite being thin and light, can satisfactorily separate light into light components having different properties, and to provide, in particular, a polarization separation device that offers high performance and high reliability.

Another object of the present invention is to provide an illumination optical system that achieves high light use efficiency.

To achieve the above objects, according to one aspect of the present invention, a polarization separation device is provided with: a diffractive optical element layer formed out of an optically substantially isotropic transparent sheet and having a diffraction grating surface; and an optically anisotropic layer formed out of an optically anisotropic birefringent material and disposed contiguously with the diffraction grating surface. Here, the diffractive optical element layer is 0.1 to 1 mm thick.

According to another aspect of the present invention, a polarization separation device is provided with: a first transparent flat plate; a second transparent flat plate; a diffractive optical element disposed between the first and second transparent flat plates and formed as a thin sheet or film of an optically substantially isotropic transparent resin; and liquid crystal sealed in between the first and second transparent flat plates. Here, the diffractive optical element has a flat surface on the side thereof facing the first transparent flat plate and has a blazed diffraction grating surface on the side thereof facing the second transparent flat plate. Moreover, with the first and second transparent flat plates firmly fitted together with sealant, the liquid crystal is sealed in between the first and second transparent flat plates so as to be contiguous with the diffraction grating surface. Moreover, the surface of the second transparent flat plate that faces the diffractive optical element has been subjected to an orientation process.

According to another aspect of the present invention, a polarization separation device is provided with: a first transparent flat plate; a second transparent flat plate; a diffractive optical element disposed between the first and second transparent flat plates and formed as a thin sheet or film of an optically substantially isotropic transparent resin; and liquid crystal sealed in between the first and second transparent flat plates. Here, the diffractive optical element has blazed diffraction grating surfaces on both sides thereof facing the first and second transparent flat plates. Moreover, with the first and second transparent flat plates firmly fitted together with sealant, the liquid crystal is sealed in between the first and second transparent flat plates so as to be contiguous with the diffraction grating surface. Moreover, the surfaces of the first and second transparent flat plates that face the diffractive optical element have been subjected to an orientation process.

According to another aspect of the present invention, an illumination optical system is provided with: a light source for emitting illumination light; an integrator rod for making the spatial energy distribution of the illumination light emitted from the light source uniform; one of the polarization separation devices described above for separating the illumination light that has exited from the integrator rod into two linearly polarized light components having mutually perpendicular polarization planes; a relay lens for relaying the two linearly polarized light components separated by the polarization separation device; and polarization plane rotating means for rotating the polarization plane of one of the two linearly polarized light components through about 90° in the vicinity of the aperture stop position of the relay lens, or in the vicinity of the position conjugate therewith, so as to make the polarization of the light that exits from the relay lens uniform.

According to another aspect of the present invention, an illumination optical system is provided with: a light source for emitting illumination light; a first lens array and a second lens array for making the spatial energy distribution of the illumination light emitted from the light source uniform; one of the polarization separation devices described above for separating the illumination light into two linearly polarized light components having mutually perpendicular polarization planes in the vicinity of the first lens array; and polarization plane rotating means for rotating the polarization plane of one of the two linearly polarized light components through about 90° in the vicinity of the second lens array, or in the vicinity of the position conjugate therewith, so as to make the polarization of the light that exits from the second lens array uniform.

According to another aspect of the present invention, a blazed grating device is provided with: a plate-shaped transparent substrate having a blazed grating formed on a surface thereof; and a separation coating formed on the blazed grating of the transparent substrate so as to reflect or transmit incident light according to the properties of the incident light.

According to another aspect of the present invention, a diffraction grating device is provided with: a plate-shaped transparent substrate having a diffraction grating formed on a surface thereof; a separation coating formed on the diffraction grating of the transparent substrate so as to reflect or transmit incident light according to how the incident light is polarized; and a plate-shaped transparent member kept in intimate contact with the diffraction grating of the transparent substrate with the separation coating sandwiched in between.

According to another aspect of the present invention, an illumination optical system is provided with a diffraction grating device, which is provided with: a plate-shaped transparent substrate having a diffraction grating formed on a surface thereof; and a separation coating formed on the diffraction grating of the transparent substrate so as to reflect or transmit incident light according to the properties of the incident light. Here, the illumination optical system uses the diffraction grating device both to direct light to an object to be illuminated so as to illuminate the object and to direct the light reflected from the object out of the illumination optical system by letting this light pass through the diffraction grating.

BRIEF DESCRIPTION OF THE DRAWINGS

This and other objects and features of the present invention will become clear from the following description, taken in conjunction with the preferred embodiments with reference to the accompanying drawings in which.

DESCRIPTION OF THE PREFERRED EMBODIMENTS

Figure 1:
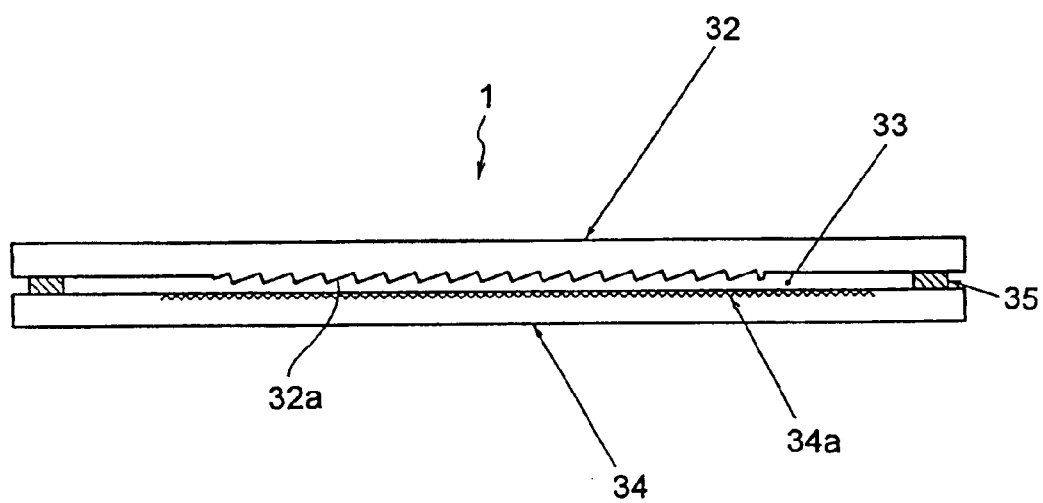
FIG. 1 is a sectional view showing the polarization separation device of a first embodiment of the invention having a diffractive optical element layer in sheet form.

Hereinafter, embodiments of the present invention will be described with reference to the drawings. It is to be noted that, in the following descriptions, such constituent elements as serve the same or corresponding purposes between different embodiments are identified with the same reference numerals or symbols, and overlapping explanations will be omitted unless necessary.

Embodiment 1: a Polarization Separation Device Having a Diffractive Optical Element Layer in Sheet Form As a first embodiment of the invention, FIG. 1 shows, in a sectional view, a polarization separation device 1 having a diffractive optical element layer 32 in sheet form. This polarization separation device 1 is provided with, as its essential constituent elements, a diffractive optical element layer 32 of a surface-relief type (i.e. a film thickness modulation type), a liquid crystal layer 33 made of nematic or smectic liquid crystal, an opposed flat plate 34, and sealant 35. The diffractive optical element layer 32 is formed as a transparent sheet of an optically substantially isotropic resin, and has a blazed diffraction grating surface 32a. The liquid crystal layer 33, which is contiguous with the diffraction grating surface 32a, is a layer of an optically anisotropic material that is optically anisotropic uniaxially. The opposed flat plate 34, which is contiguous with the liquid crystal layer 33 so that the liquid crystal layer 33 is sandwiched between the opposed flat plate 34 and the diffractive optical element layer 32, is a transparent substrate made of resin or glass. On the liquid crystal layer 33 side surface of the opposed flat plate 34 is provided an orientation film 34a, which has been subjected to a rubbing process so that the liquid crystal molecules are oriented homogeneously along the grooves of the diffraction grating surface 32a.

It is preferable that the diffractive optical element layer 32 be made of a thermoplastic resin, examples of which include PA (polyamide), PE (polyethylene), PS (polystyrene), PVC (polyvinyl chloride), PMMA (polymethyl methacrylate), PC (polycarbonate), amorphous polyolefin resin, etc. Using a thermoplastic resin as the material of the diffractive optical element layer 32 permits it to be injection-molded, and thus permits it to be manufactured cheaply. Moreover, it is preferable that the opposed flat plate 34 and the diffractive optical element layer 32 have substantially the same linear expansion coefficient. Giving them substantially the same linear expansion coefficient helps achieve high reliability, because then, even when the diffractive optical element layer 32 and the opposed flat plate 34 expand or contract as a result of a change in environmental conditions, such as a variation in temperature, they are less likely to come apart from each other at the sealant 35. To give them substantially the same linear expansion coefficient, it is preferable that the opposed flat plate 34 and the diffractive optical element layer 32 be made of the same material, and it is further preferable that they be both made of an optically substantially isotropic resin.

The liquid crystal sealed in between the diffractive optical element layer 32 and the opposed flat plate 34 is a birefringent material that is optically anisotropic, and therefore exhibits different refractive indices to ordinary and extraordinary light. Accordingly, the diffracting effect exerted by the diffraction grating surface 32a, which is disposed at the boundary between the liquid crystal and the diffractive optical element layer 32, which is optically substantially isotropic, acts differently upon ordinary and extraordinary light. In this polarization separation device 1, the materials used are so selected that the refractive index of the liquid crystal for either ordinary or extraordinary light is equal to the refractive index of the diffractive optical element layer 32. For example, when the refractive index of the liquid crystal layer 33 for ordinary light is set equal to the refractive index of the diffractive optical element layer 32, ordinary light is transmitted through the diffraction grating surface 32a without being acted upon by the diffracting effect thereof, and extraordinary light is deflected by being acted upon by the diffracting effect exerted by the diffraction grating surface 32a. By contrast, when the refractive index of the liquid crystal layer 33 for extraordinary light is set equal to the refractive index of the diffractive optical element layer 32, extraordinary light is transmitted through the diffraction grating surface 32a without being acted upon by the diffracting effect thereof, and ordinary light is deflected by being acted upon by the diffracting effect exerted by the diffraction grating surface 32a.

Disposing the liquid crystal layer 33 and the diffraction grating surface 32a contiguously as described above makes it possible to separate the illumination light incident thereon into two linearly polarized light components having mutually perpendicular polarization planes. In addition, using the "blazed" diffraction grating surface 32a helps achieve high diffraction efficiency. The higher the diffraction efficiency obtained on the diffraction grating surface 32a, the higher the polarization conversion efficiency achieved, and thus the higher the light use efficiency achieved.

To achieve polarization separation of illumination light by the use of the polarization separation device 1 described above, the illumination light may be introduced thereto from either side thereof, i.e. either from the diffractive optical element layer 32 side or the opposed flat plate 34 side thereof. It is preferable, however, that the optical members that are disposed on the exit side of the diffraction grating surface 32a be made appropriately thin. Since the illumination light that is incident on the polarization separation device 1 is unpolarized, even if its polarization is disturbed until it reaches the diffraction grating surface 32a, no problem results; however, if the polarization of the illumination light is disturbed in an optical member through which it passes after it has undergone polarization separation on the diffraction grating surface 32a, polarization separation efficiency lowers, which makes it impossible to obtain the desired performance. One of the causes of such disturbance of polarization is the birefringence of an optical member. Even when an optical member is formed as a transparent member made of an optically substantially isotropic material, as the optical member is made thicker, it exerts a stronger effect of birefringence, which makes disturbance of polarization more likely. Making an optical member thin reduces the effect of its birefringence, and thus helps suppress disturbance of polarization. In addition, making an optical member thin also offers the advantage of higher transmission efficiency.

For these reasons, it is preferable that an optical member that is disposed at the exit side of the diffraction grating surface 32a be made 0.1 to 1 mm thick. In particular, it is preferable that the diffractive optical element layer 32 be made 0.1 to 1 mm thick. Forming the diffractive optical element layer 32 as a thin film in this way makes it possible to prevent disturbance of polarization caused by the effect of birefringence as described above even in cases where the polarization separation device 1 is used in such a way that the polarized light components obtained as a result of polarization separation exit therefrom at the diffractive optical element layer 32 side thereof. In cases where the diffractive optical element layer 32 is molded out of resin, it is preferable to make it thin, because doing so makes its molding easier, and thus helps reduce the cost. However, making the diffractive optical element layer 32 thinner than 0.1 mm lowers its mechanical strength, and thus makes its handling difficult.

Now, the thickness of the diffractive optical element layer 32 will be discussed in more detail. Ideally, optical materials, such as optical resins and optical glasses, should be optically isotropic and should not exhibit birefringence. In reality, however, any optical material exhibits a slight degree of birefringence. The causes of this birefringence include the stress that remains inside an optical material after molding, the stress that develops in a molded member as a result of a mechanical force applied thereto or a temperature difference caused by heating and cooling, etc.

Such birefringence causes an optical path difference that is given by formula (FA) below. Table 1 lists the optical path difference $\delta$ (nm) caused by birefringence in different optical materials when d=1.

$$\delta = B \cdot \sigma \cdot d \quad (FA)$$

where $\delta$ represents the optical path difference (nm) caused by birefringence;

B represents the photoelasticity constant ($\times 10^{-12}$/Pa);

$\sigma$ represents the stress difference ($10^5$ Pa) that has developed in the optical material; and d represents the thickness (cm) of the optical material.

TABLE 1

| Optical Material | $\delta$ (nm) |
|---|---|
| PMMA | -6 |
| PMMA (near a gate) | 50 |
| PC | 72 |
| Amorphous Polyolefin Resin | 6 |
| Optical Glass | 0.2 to 5 |

Of the two linearly polarized light components separated by the polarization separation device 1 shown in FIG. 1, one then has its polarization plane rotated through 90° so that the two linearly polarized light components have the same polarization plane. To achieve this, a polarization plane rotating means is used, which is realized, for example, with a half-wave plate such as is used in the illumination optical system described later (66 in FIGS. 20 to 22). A half-wave plate is a phase plate that rotates the polarization plane of one of the linearly polarized light components through 90° by giving it an optical path difference corresponding to half its wavelength. This means that, unless the optical path difference $\delta$ caused by birefringence is sufficiently small (in the order of several percent) relative to half the wavelengths of visible light (i.e., for the e-line, relative to 273 nm, which is half of 546.1 nm), it is impossible to achieve polarization conversion satisfactorily.

In general, an optical resin exhibits ten times or more as high a degree of birefringence as an optical glass that exhibits a relatively low degree of birefringence. For this reason, in cases where the diffractive optical element layer 32 is made of resin, when the illumination light from a lamp (60 in FIGS. 20 to 22) travels from the liquid crystal layer 33 to the diffractive optical element layer 32, as the linearly polarized light components obtained as a result of polarization separation on the diffraction grating surface 32a travel through the resin forming the diffractive optical element layer 32, their polarization is disturbed, which makes polarization separation impossible. While the birefringence ascribable to a resin material itself has a strong effect, even with a single resin material, the birefringence ascribable to the internal stress that inevitably remains inside it after molding also has a strong effect. For example, in injection molding, an intense stress remains near a gate (i.e. an opening through which the resin is injected), where the resin exhibits an accordingly high degree of birefringence.

In Table 1, in the column of the value $\delta$ are listed actual values of the birefringence that different optical materials exhibit when their thickness d is 1 (cm), and these values show that a considerably high degree of birefringence is observed in PMMA near a gate and in PC. An effective way to eliminate the effect of such birefringence is to make the optical material thinner. For example, the optical path difference $\delta$ for the e-line (wavelength $\lambda$=546.1 nm) caused by birefringence in PMMA (near a gate) when its thickness d=1 (cm) is 50 (nm), which means that the birefringence exerts a strong effect. By contrast, when the thickness is reduced to about one-tenth, i.e. 1 (nm), then the optical difference $\delta$ for the same wavelength $\lambda$=546.1 (nm) is reduced to about 5 (nm), which is a sufficiently small value in practical terms, and thus the effect of the birefringence is negligible. However, as described previously, making the optical material too thin makes it impossible to secure sufficient mechanical strength, and therefore it is preferable to make the optical material at least about 0.1 (mm) thick. In summary, it is preferable that the diffractive optical element layer 32 be made about 0.1 to 1 (mm) thick irrespective of its material, and, when the diffractive optical element layer 32 is made of an optical resin, it is particularly preferable that it be made 0.1 to 1 (mm) thick.

It is preferable that the diffraction grating surface 32a fulfill conditional formulae (1) and (2), and in addition (3) or (4) below. Fulfilling these conditional formulae helps enhance polarization separation efficiency. If the lower limit of conditional formula (2) is transgressed, the diffraction grating height is so great relative to the diffraction grating pitch that obliquely incident light is not diffracted effectively. This lowers diffraction efficiency. The same is true if the upper limit of conditional formula (1) is transgressed. Using liquid crystal as a birefringent material is effective in producing easily and cheaply an optically anisotropic layer that exhibits birefringence, and no liquid crystal has ever been known to transgress the upper limit of conditional formula (2). If the lower limit of conditional formula (1) is transgressed, it is difficult to form the diffraction grating surface 32a.

$$1.5 < H < 6 \quad (1)$$

$$0.1 < \Delta n < 0.3 \quad (2)$$

$$np \approx no \quad (3)$$

$$np \approx ne \quad (4)$$

where

H represents the diffraction grating height (μm);

Δn represents the greater of the refractive index differences |np−no| and |np−ne|;

np represents the refractive index of the diffractive optical element layer 32;

no represents the refractive index for ordinary light of the optically anisotropic layer (here, the liquid crystal layer 33); and ne represents the refractive index for extraordinary light of the optically anisotropic layer (here, the liquid crystal layer 33).

It is preferable that the diffraction grating surface 32*a* fulfill conditional formula (5) below. Conditional formula (5) defines the condition that, when the polarization separation device 1 is used in an illumination optical system, permits a compact layout and ensures high polarization separation efficiency. If the lower limit of conditional formula (5) is transgressed, obliquely incident light is not diffracted effectively, which lowers diffraction efficiency. If the upper limit of conditional formula (5) is transgressed, the polarization separation angle becomes so small that the conjugate length needs to be increased, which makes it difficult to achieve satisfactory compactness.

$$5 < D < 15 \quad (5)$$

where

D represents the diffraction grating pitch (μm).

Figure 2:
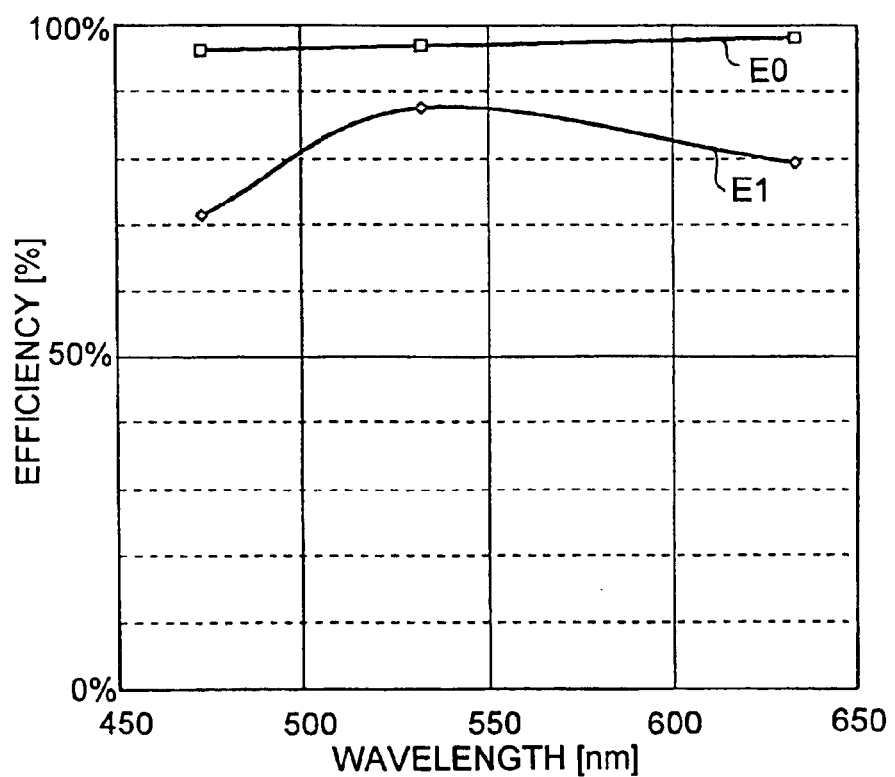
FIG. 2 is a graph showing the wavelength dependence of the transmission efficiency and diffraction efficiency of the polarization separation device shown in FIG. 1.

FIG. 2 is a graph showing the wavelength dependence of the transmission efficiency (E0, for the diffracted light of order 0) and the diffraction efficiency (E1, for the diffracted light of order +1) observed in the polarization separation device 1. Here, the diffractive optical element layer 32 has a diffraction grating pitch D=8.5 (μm), a diffraction grating height H=2.75 (μm), and a refractive index np=1.52, and the diffraction angle of the diffracted light of order +1 is 3.8 (°). The liquid crystal layer 33 has refractive indices no=1.52 and ne=1.72 for ordinary and extraordinary light, respectively (hence, Δn=0.2).

Figure 3:
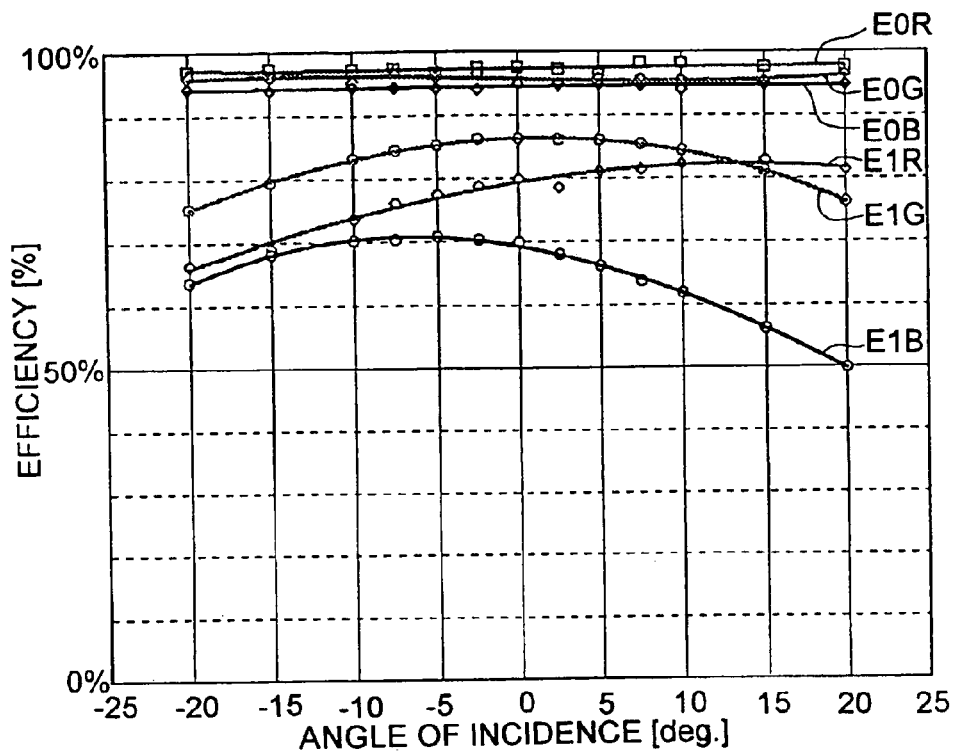
FIG. 3 is a graph showing the angle-of-incidence dependence of the transmission efficiency and diffraction efficiency of the polarization separation device shown in FIG. 1.

FIG. 3 is a graph showing the wavelength dependence, plotted separately for light of different wavelengths R, G, and B (R: 633 nm, G: 532 nm, and B: 473 nm), of the transmission efficiency (E0R, E0G, and E0B, for the diffracted light of order 0) and the diffraction efficiency (E1R, E1G, and E1B, for the diffracted light of order +1) observed in the polarization separation device 1. As FIG. 3 shows, for light of all wavelengths R, G, and B, it is possible to obtain transmission efficiency (E0R, E0G, and E0B) of 90% or higher, and diffraction efficiency (E1R, E1G, and E1B) of 50% or higher within the range of angles of incidence of ±20°.

Figure 4:
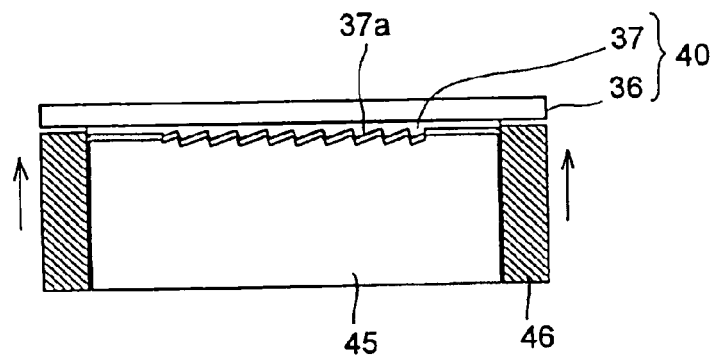
FIG. 4 is a sectional view showing the process of forming the diffraction grating surface of the composite-type diffractive optical device of a second embodiment of the invention.
Figure 5:
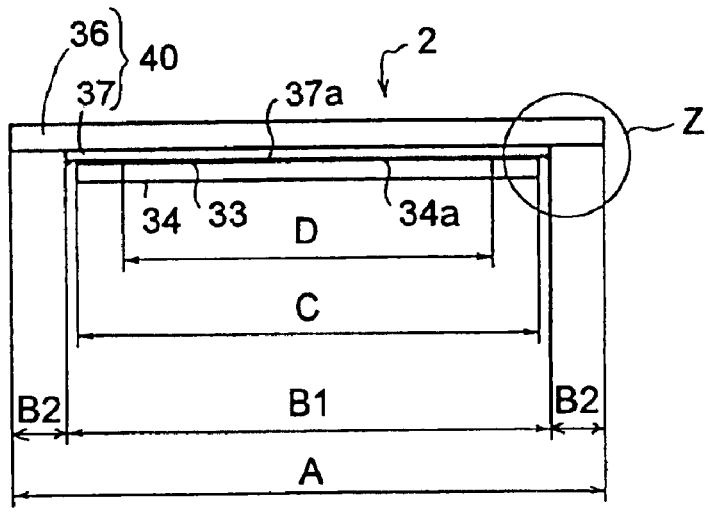
FIG. 5 is a sectional view showing a polarization separation device employing the diffractive optical device shown in FIG. 4.

Embodiment 2: a Polarization Separation Device Having a Composite-type Diffractive Optical Element As a second embodiment of the invention, FIG. 5 shows, in a sectional view, a polarization separation device 2 having a diffractive optical element 40. FIG. 4 shows, in a sectional view, the process of forming the diffraction grating surface 37*a* of the diffractive optical element 40. This polarization separation device 2 is provided with a diffractive optical element 40 of a composite, surface-relief type produced by forming on a glass substrate 36 a resin layer 37 having a diffraction grating surface 37*a* on its surface. A liquid crystal layer 33 is provided contiguously with the diffraction grating surface 37*a*. The liquid crystal layer 33 is made of nematic or smectic liquid crystal. An opposed flat plate 34 is provided contiguously with the liquid crystal layer 33 so that the liquid crystal layer 33 is sandwiched between the opposed flat plate 34 and the resin layer 37. The opposed flat plate 34 is a transparent substrate made of resin or glass. On the liquid crystal layer 33 side surface of the opposed flat plate 34 is provided, as in the polarization separation device 1 described previously, an orientation film 34*a*, which has been subjected to a rubbing process so that the liquid crystal molecules are oriented homogeneously along the grooves of the diffraction grating surface 37*a*.

To form the diffraction grating surface 37*a*, first a UV (ultraviolet)-curing resin is applied on a core metal mold 45 shown in FIG. 4, then the glass substrate 36 is placed on top thereof, then the glass substrate 36 is pressed so that the resin has a predetermined thickness, and then UV rays are applied. When the UV-curing resin has hardened, the peripheral portion of the glass substrate 36 is pressed with an ejector 46 so that the glass substrate 36 is released. This process yields a resin layer 37, made of a UV-curing resin, that has on its surface a blazed diffraction grating surface 37*a*. The resin layer 37 is not formed in those portions, out of the entire region (A), of the surface of the glass substrate 36 where the glass substrate 36 makes contact with the ejector 46 when released. Thus, as shown in FIG. 5, on the glass substrate 36 are formed a resin-coated region (B1) where the resin layer 37 is formed and a non-coated region (B2) where the resin layer 37 is not formed.

Figure 6:
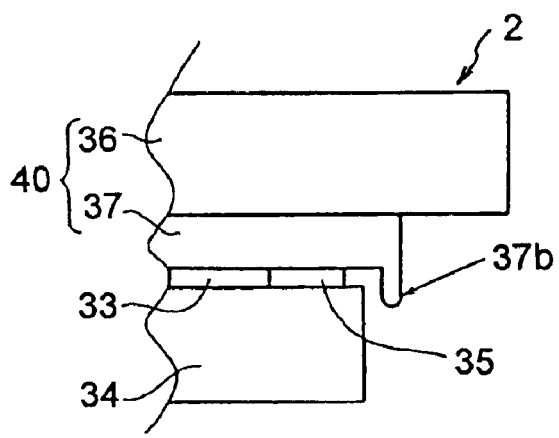
FIG. 6 is an enlarged view of a portion (the encircled portion Z) of the polarization separation device shown in FIG. 5.

Then, sealant 35 (FIG. 6) is applied on the thus obtained resin layer 37, and the opposed flat plate 34 is fixed. Here, the opposed flat plate 34 is so placed as not to extend outside the resin-coated region (B1) of the resin layer 37 and overhang the non-coated region (B2) thereof. Out of the resin-coated region (B1) of the resin layer 37, the region (D) overlapping the liquid crystal layer 33 is restricted by the sealant 35, and thus the region (C) overlapping the opposed flat plate 34 is an intermediate region between the regions (D) and (B1). That is, the sizes of these regions fulfill the relation D<C<B1<A When the diffraction grating surface 37*a* is formed in the above-described manner, burrs 37*b* are formed simultaneously by the resin trapped in the gap between the core metal mold 45 and the ejector 46 as shown in FIG. 6 (a detail view of the encircled portion Z of FIG. 5). Whereas the burrs 37*b* have heights of about 50 to 100 μm, the liquid crystal layer 33 has a thickness of 30 μm or less, and preferably about several micrometers. Although the thickness of the liquid crystal layer 33 is controlled with spacers (not shown) having a thickness of about 5 to 10 μm, if the opposed flat plate 34 settles on the burrs 37*b*, it slants and floats, which makes it impossible to control the thickness of the liquid crystal layer 33. As the liquid crystal layer 33 is made thicker, the orientation of the liquid crystal molecules becomes increasingly random in and around the middle portion of the liquid crystal layer 33. This hinders the liquid crystal layer 33 from functioning properly as an optically anisotropic layer (for example, it becomes clouded, or whitish). This problem can be prevented by scraping off the burrs 37*b* so that the opposed flat plate 34 does not settle on the burrs 37*b*. However, the extra step added to achieve this increases the cost. Moreover, scraping off the burrs 37*b* causes fine scars on the resin layer 37. Under severe environmental conditions, such as an abrupt variation in temperature, such fine scars develop into cracks in the resin layer 37.

To solve this problem, the opposed flat plate 34 is so placed as not to extend outside the resin-coated region (B1) and overhang the non-coated region (B2). This arrangement prevents the opposed flat plate 34 from settling on burrs 37*b* even when there are any. This makes it possible to control the thickness of the liquid crystal layer 33 with the spacers, and thus to seal in liquid crystal in the form of a thin layer between the resin layer 37 and the opposed flat plate 34. Moreover, there is no need to add an extra step to scrape off the burrs 37*b*. This helps avoid increasing the cost, and prevents scars on the resin layer 37 that tend to develop into cracks. In this way, it is possible to make the polarization separation device 2 easy to manufacture and highly reliable.

Figure 7:
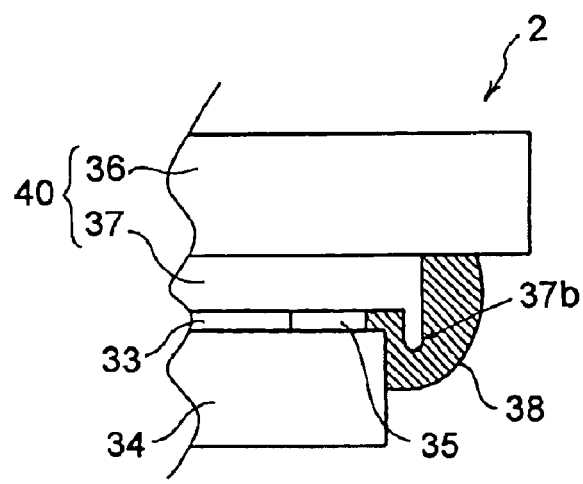
FIG. 7 is an enlarged view showing how an end portion (where there are burrs) of the resin layer of the polarization separation device shown in FIG. 5 is covered with the protective agent.
Figure 8:
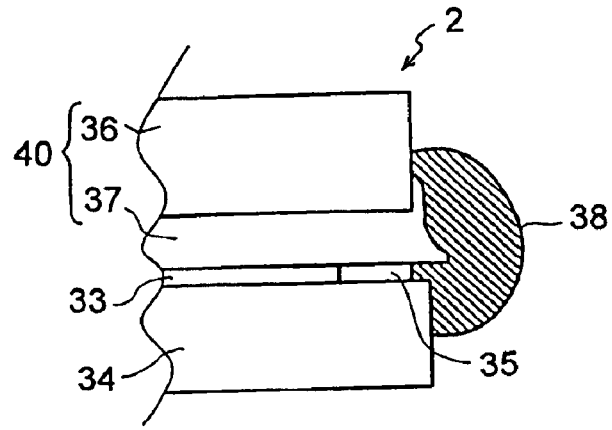
FIG. 8 is an enlarged view showing how an end portion (where there are no burrs) of the resin layer of the polarization separation device shown in FIG. 5 is covered with the protective agent.
Figure 9:
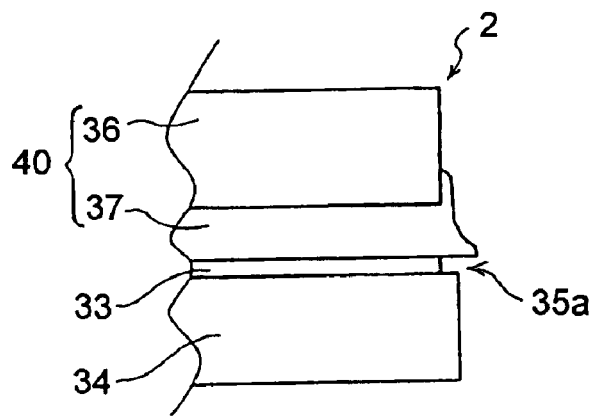
FIG. 9 is an enlarged view showing the liquid crystal injection opening portion of the polarization separation device shown in FIG. 5.
Figure 10:
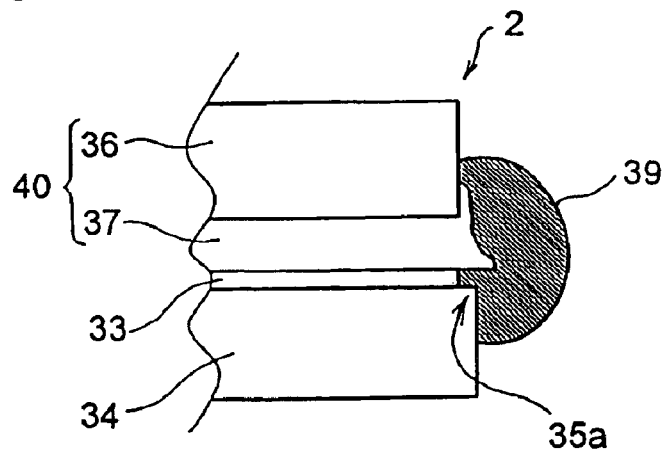
FIG. 10 is an enlarged view showing how the liquid crystal injection opening portion of the polarization separation device shown in FIG. 5 is covered with the sealing agent.
Figure 11:
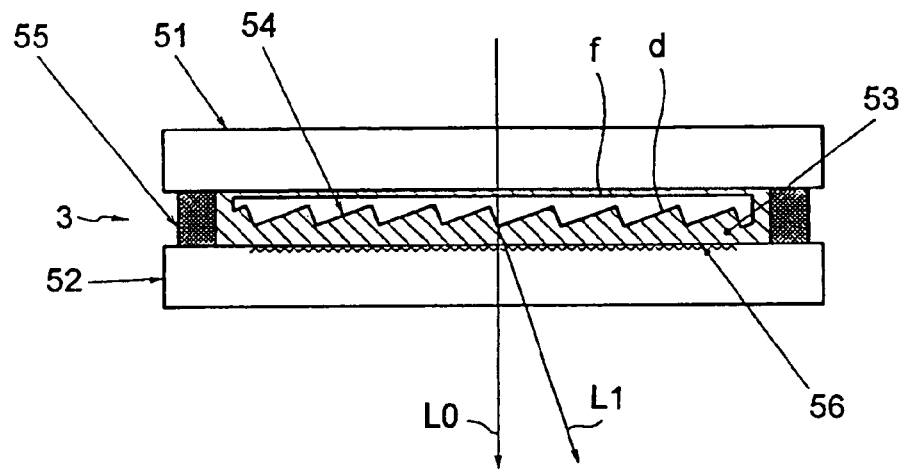
FIG. 11 is a sectional view of the polarization separation device of a third embodiment of the invention.

When, as shown in FIG. 6, the burrs 37*b* are left without being scraped off, they may chip off and cause a crack in the resin layer 37. To prevent such chipping-off or the like of the burrs 37*b*, it is preferable that, as shown in FIG. 7, the burrs 37*b* be covered with a protective agent 38. As the protective agent 38, a flexible material, such as silicone rubber, is suitable. Since the burrs 37*b* form as a result of the UV-curing resin making contact with the ejector 46, no burrs form in those positions of the resin layer 37, even along the edges thereof, where the resin layer 37 does not make contact with the ejector 46. Where there are no burrs, there is no need for the protective agent 38. However, to complement the function of the sealant 35, it is preferable that, as shown in FIG. 8, even those portions of the resin layer 37 along the edges thereof where there are no burrs 37*b* be covered with the protective agent 38. Similarly, no burrs form in the portion of the resin layer 37, even along an edge thereof, around a liquid crystal injection opening 35*a* shown in FIG. 9 where the ejector 46 does not make contact with the glass substrate 36. It is advisable that, as shown in FIG. 10, this portion around the liquid crystal injection opening 35*a* be covered with a sealing agent 39. As the sealing agent 39, silicone rubber, a UV-curing resin, or the like is used.

In the polarization separation device 2, the region (D) overlapping the liquid crystal layer 33 is the actually used region, i.e. the region through which the illumination light actually passes. The region outside the liquid crystal layer 33 (for example the portion where the sealant 35 is applied, the portion where the sealing agent 39 for sealing the liquid crystal injection opening 35*a* is applied, and the like) is the unused region, i.e. the region other than the actually used region (D). In cases where a UV-curing resin or the like is used as the sealant 35 and the sealing agent 39, which are applied in the unused region, if light strikes the resin in actual use, the resin absorbs light and becomes hot, or deteriorates as a result of irradiation for an extended period. This may lead to lower reliability. Moreover, a variation in temperature causes variations in the refractive indices of the liquid crystal and the resin, which may lower the diffraction efficiency of the diffractive optical element 40. For these reasons, to prevent light from striking the unused region, it is preferable to provide a thin mask plate that reflects light (for example, a metal reflecting plate made of stainless steel or the like) to shield the illumination light from the light source.

In the polarization separation device 2 shown in FIG. 5, as in the polarization separation device 1 shown in FIG. 1, to enhance polarization separation efficiency, it is preferable that the diffraction grating surface 37*a* fulfill conditional formulae (1) and (2), and in addition (3) or (4) noted previously. It is to be noted that, here, np represents the refractive index of the resin layer 37. Moreover, it is preferable that the thickness of the liquid crystal layer 33 be 50 µm or less. If the thickness of the liquid crystal layer 33 is greater than 50 µm, it is difficult to orient the liquid crystal molecules with the orientation film 34*a*. This makes the orientation of the liquid crystal molecules in and around the middle portion of the liquid crystal layer 33 random, and thus makes it difficult to obtain the desired performance (diffraction efficiency).

Embodiments 3 to 11: Polarization Separation Devices

FIGS. 11 to 19 respectively show, in sectional views, the polarization separation devices 3 to 11 of a third to an eleventh embodiment of the invention. The polarization separation devices 3 to 11 are each provided with, as their essential constituent elements, a first glass substrate 51 or 51A, a second glass substrate 52 or 52A, liquid crystal 53, a diffractive optical element 54 or 54A, and sealant 55. Between the first glass substrate 51 or 51A and the second glass substrate 52 or 52A, the diffractive optical element 54 or 54A is disposed, and the liquid crystal 53 is sealed in. As the liquid crystal 53, nematic, smectic, or other liquid crystal is used. As the sealant 55, a UV-curing, thermosetting, or other resin is used. As the first and second glass substrates 51 or 51A and 52 or 52A, transparent flat plates made of the same transparent resin (i.e. transparent resin flat plates) may be used.

The diffractive optical element 54 or 54A is a DOE (diffractive optical element) of a surface-relief type (i.e. a film thickness modulation type) that is formed as a thin sheet or film of an optically substantially isotropic transparent resin, and has at least one blazed diffraction grating surface (d). In the polarization separation devices 3 to 7 shown in FIGS. 11 to 15, the diffractive optical element 4 has a flat surface (f) on the first glass substrate 51 or 51A side thereof, and has a blazed diffraction grating surface (d) on the second glass substrate 52 or 52A side thereof. In the polarization separation devices 8 to 11 shown in FIGS. 16 to 19, the diffractive optical element 4A has blazed diffraction grating surfaces (d) on both sides thereof.

A diffractive optical element 54 or 54A formed as a thin sheet or film can be produced easily and cheaply through a resin molding process such as injection molding, and therefore using such a diffractive optical element helps reduce the cost of the polarization separation devices 3 to 11. Moreover, whereas the diffractive optical element 4 has one diffraction grating surface (d), the diffractive optical element 4A has two diffraction grating surfaces (d), and this makes it possible to reduce the diffraction grating height of each diffraction grating surface (d) of the diffractive optical element 4A to about half the diffraction grating height required in the diffractive optical element 4 to obtain the same diffraction angle. Reducing the blaze height makes the molding of the diffraction gratings easier, and thus makes the diffractive optical element 4A easier to manufacture. Conversely, given the same diffraction grating height, the two diffraction grating surfaces (d) of the diffractive optical element 4A together offer twice the diffraction angle obtained with the diffractive optical element 4.

It is preferable that the diffractive optical element 54 or 54A be made of, as described previously, a thermoplastic resin such as PA, PE, PS, PVC, PMMA, amorphous polyolefin resin, etc. As a material, a thermoplastic resin is cheaper than a UV-curing resin, and moreover using a thermoplastic resin as the material of the diffractive optical element 54 or 54A permits it to be produced by injection molding or press molding (whereby a diffraction grating is formed on the surface of a sheet of a thermoplastic resin with a metal mold pressed onto it). This helps produce the diffractive optical element 54 or 54A cheaply.

In the third to eleventh embodiments, with the first and second glass substrates 51 and 52 firmly fitted together by the sealant 55, the liquid crystal 53 is sealed in between the first and second glass substrates 51 and 52 so as to be contiguous with the diffraction grating surface (d) without any gap left. On any surface of the glass substrates that faces any diffraction grating surface (d), an orientation film 56 (for example a polyimide orientation film) is provided that has been subjected to a rubbing process so that the molecules of the liquid crystal 53 are oriented homogeneously along the grooves of the diffraction grating surface (d). Specifically, to achieve homogeneous orientation of the molecules of the liquid crystal 53, in the polarization separation devices 3 to 7 shown in FIGS. 11 to 15, the diffractive optical element 54 side surface of the second glass substrate 52 has been subjected to an orientation process, and, in the polarization separation devices 8 to 11 (shown in FIGS. 16 to 19), the diffractive optical element 54A side surfaces of the first and second glass substrates 51 and 52 have been subjected to an orientation process. The layer of the liquid crystal 53 disposed between the diffraction grating surface(s) (d) and the glass substrate surface(s) forms an optically anisotropic layer that is optically anisotropic uniaxially. In cases where the diffractive optical element 54 or 54A is disposed on the entrance side, it is also possible to use an orientation with such a mild twist as to barely show optical rotatory power. This does not sacrifice polarization separation performance as long as the direction of orientation is set exactly by the second glass substrate 52 disposed on the exit side.

In the polarization separation devices 3, 6 to 8, and 10 shown in FIGS. 11, 14 to 16, and 18, the diffractive optical element 54 or 54A is fixed to none of the first and second glass substrates 51 or 51A and 52 or 52A and the sealant 55, and is thus floating in the liquid crystal 53. Hence, even when a change in environmental conditions (such as a variation in temperature) causes the diffractive optical element 54 or 54A to expand, contract, or warp, this does not affect the other constituent elements, and thus it is possible to maintain high reliability. To stabilize the position of the diffractive optical element 54 or 54A relative to the first and second glass substrates 51 or 51A and 52 or 52A, spacers (about 5 to 10 μm thick) may be inserted between the first glass substrate 51 or 51A or the second glass substrate 52 or 52A and the diffractive optical element 54 or 54A.

Figure 12:
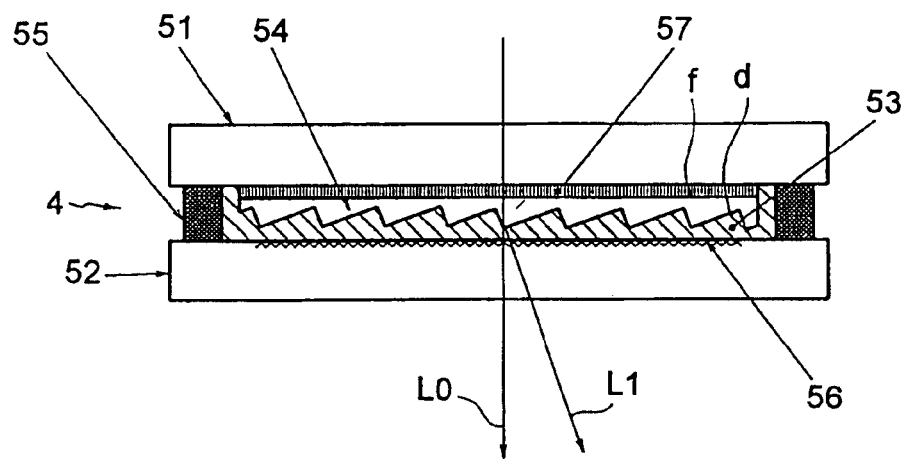
FIG. 12 is a sectional view of the polarization separation device of a fourth embodiment of the invention.

In the polarization separation device 4 shown in FIG. 12, the diffractive optical element 54 is, on the flat surface (f) side thereof, bonded to the first glass substrate 51. The diffractive optical element 54 is bonded to the first glass substrate 51 with adhesive 57, of which the thickness is about several tens of micrometers, and preferably about 20 μm. Fixing the diffractive optical element 54 to the first glass substrate 51 in this way helps stabilize the position of the diffractive optical element 54, and thus makes the handling thereof in the manufacturing process easy. Even when the diffractive optical element 54 is fixed to the first glass substrate 51, the effect of the difference between their linear expansion coefficients is alleviated by the deformation of the adhesive 57 that accompanies the expansion or contraction of the first glass substrate 51 and the diffractive optical element 54, and is thus negligible. In addition, it is possible to save so much liquid crystal 53 as corresponds to the space occupied by the adhesive 57. The adhesive 57 may be of a sheet or liquid type, and may be applied to the whole or part of the flat surface (f).

Figure 13:
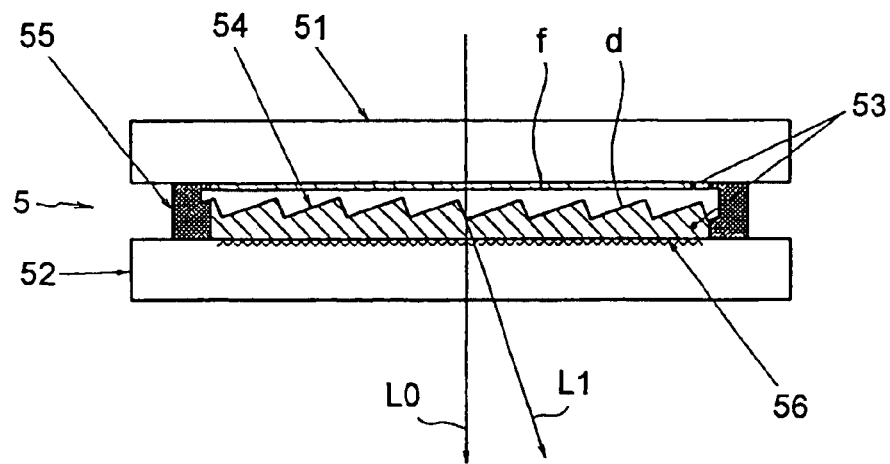
FIG. 13 is a sectional view of the polarization separation device of a fifth embodiment of the invention.
Figure 14:
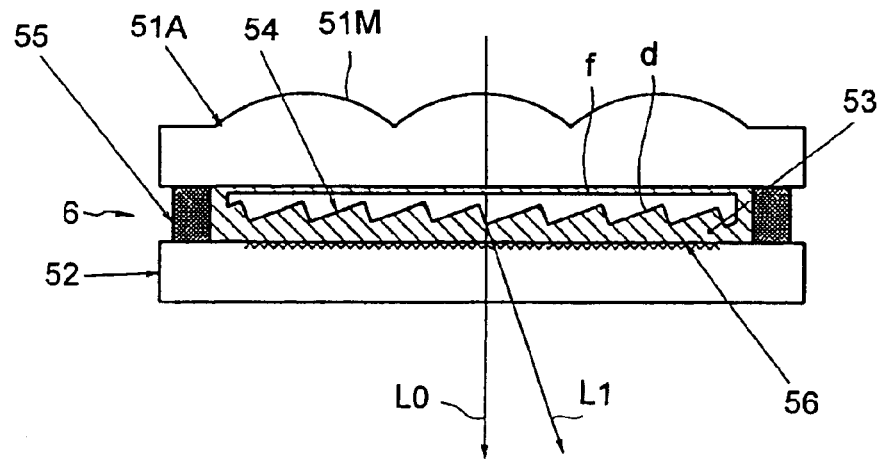
FIG. 14 is a sectional view of the polarization separation device of a sixth embodiment of the invention.
Figure 15:
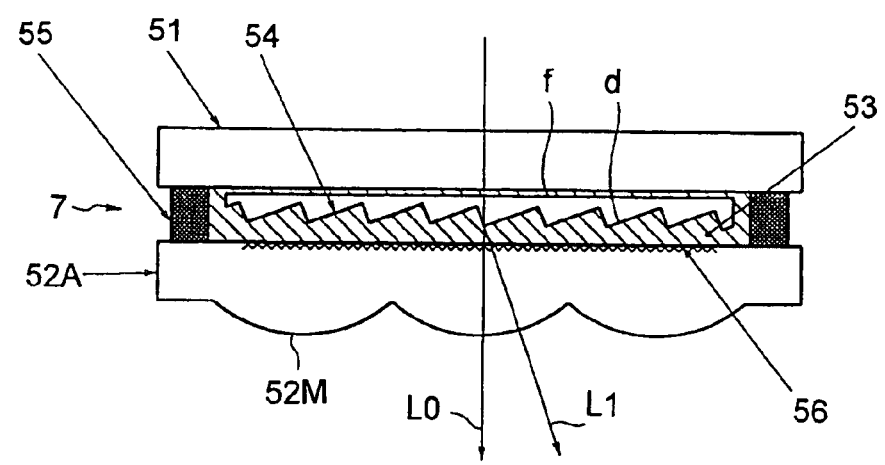
FIG. 15 is a sectional view of the polarization separation device of a seventh embodiment of the invention.
Figure 16:
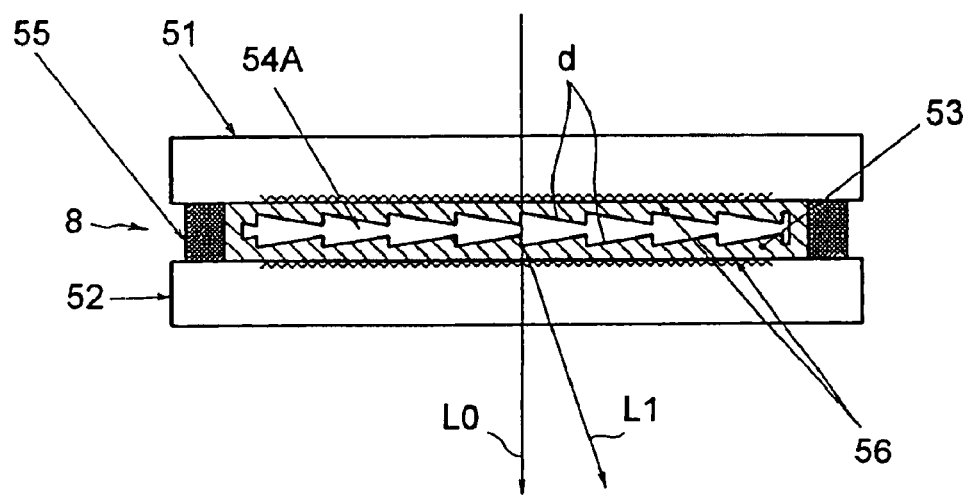
FIG. 16 is a sectional view of the polarization separation device of an eighth embodiment of the invention.
Figure 17:
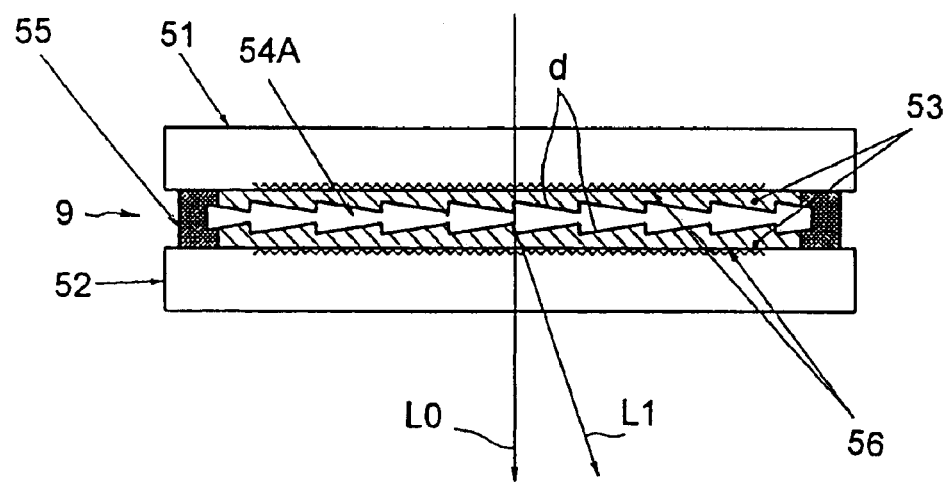
FIG. 17 is a sectional view of the polarization separation device of a ninth embodiment of the invention.
Figure 18:
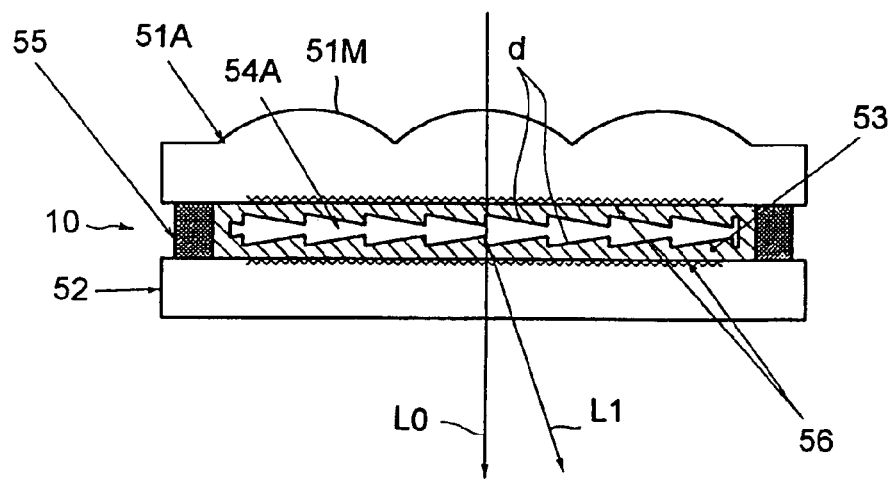
FIG. 18 is a sectional view of the polarization separation device of a tenth embodiment of the invention.
Figure 19:
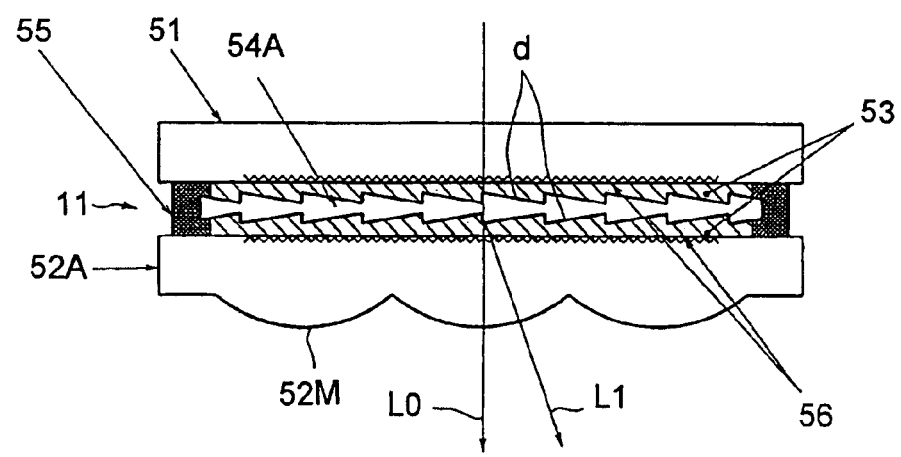
FIG. 19 is a sectional view of the polarization separation device of an eleventh embodiment of the invention.

In the polarization separation devices 5, 9, and 11 shown in FIGS. 13, 17, and 19, the diffractive optical element 54 or 54A and the first and second glass substrates 51 and 52 or 52A are firmly fitted together by the sealant 55. Firmly fitting together the diffractive optical element 54 or 54A and the first and second glass substrates 51 and 52 or 52A with the sealant 55 helps stabilize the position of the diffractive optical element 54 or 54A and thereby prevent undulation thereof, and thus helps enhance the reliability of the polarization separation devices 5, 9, and 11.

In the polarization separation devices 5, 9, and 11, the diffractive optical element 54 or 54A is firmly fitted along two opposite sides thereof; however, it may be fitted along all sides or only one side thereof, or at one point or at two or more points along one side, or at one point or at two or more points along each of two or more sides. In cases where the fitting is achieved at one point or at two or more points per side, when the sealant 55 is applied to the first or second glass substrate 51, or 52 or 52A, it is applied in such a way that portions of the sealant 55 protrude toward the center of the glass substrate 51, or 52 or 52A, and then the diffractive optical element 54 or 54A is placed on those protruding portions of the sealant 55. In cases where the diffractive optical element 54 or 54A is fitted along only one side thereof, even when a change in environmental conditions causes the diffractive optical element 54 or 54A to expand or contract, this does not affect the sealant 55, because the opposite side is not fixed, and thus it is possible to achieve high reliability.

In the polarization separation devices 6, 7, 10, and 11 shown in FIGS. 14, 15, 18, and 19, on the surface of the first glass substrate 51A or the second glass substrate 52A opposite to the diffractive optical element 54 or 54A, a first lens array 51M or 52M having a plurality of lens cells for separating the incident light is formed as part of an integrator. The first lens array 51M or 52M is composed of rectangular lens cells, geometrically similar to the liquid crystal panel 69 (FIG. 23) described later, arranged in a two-dimensional array. These lens cells image the light beams that pass therethrough in such a way that all those light beams are superimposed on one another on the liquid crystal panel 69, and in this way the liquid crystal panel 69 is illuminated uniformly. By forming the first or second glass substrate 51A or 52A integrally with the first lens array 51M or 52M, it is possible to omit one glass substrate and thereby reduce the cost. In addition, this also helps reduce the number of reflecting surfaces, and thus the number of anti-reflection coatings to be applied thereto, specifically by two, and thereby enhance light use efficiency and further reduce the cost.

The liquid crystal 53 sealed in between the first and second glass substrates 51 or 51A and 52 or 52A is a birefringent material that is optically anisotropic, and thus exhibits different refractive indices to ordinary and extraordinary light. Accordingly, the diffracting effect exerted by the diffraction grating surface (d), which is disposed at the boundary between the liquid crystal and the diffractive optical element 54 or 54A, which is optically substantially isotropic, acts differently upon ordinary and extraordinary light. In the polarization separation devices 3 to 11 of the third to eleventh embodiments, the materials used are so selected that the refractive index of the liquid crystal for either ordinary or extraordinary light is equal to the refractive index of the diffractive optical element 54 or 54A. For example, when the refractive index of the liquid crystal 53 for ordinary light is set equal to the refractive index of the diffractive optical element 54 or 54A, ordinary light is transmitted through the diffraction grating surface (d) without being acted upon by the diffracting effect thereof, and extraordinary light is deflected by being acted upon by the diffracting effect exerted by the diffraction grating surface (d). By contrast, when the refractive index of the liquid crystal 53 for extraordinary light is set equal to the refractive index of the diffractive optical element 54 or 54A, extraordinary light is transmitted through the diffraction grating surface (d) without being acted upon by the diffracting effect thereof, and ordinary light is deflected by being acted upon by the diffracting effect exerted by the diffraction grating surface (d).

As described previously in connection with the first and second embodiments, disposing the liquid crystal 53 and the diffraction grating surface (d) contiguously makes it possible to separate the illumination light incident thereon into two linearly polarized light components having mutually perpendicular polarization planes, i.e. a transmitted light component (L0) and a diffracted light component (L1). In addition, using the "blazed" diffraction grating surface (d) helps achieve high diffraction efficiency. The higher the diffraction efficiency obtained on the diffraction grating surface (d), the higher the polarization conversion efficiency achieved, and thus the higher the light use efficiency achieved. In the polarization separation devices 3 to 11, the surfaces to which to apply anti-reflection coatings or the like are glass surfaces, and therefore it is possible to obtain highly reliable anti-reflection coatings easily (as compared with plastic surfaces).

Here also, to achieve polarization separation of illumination light by the use of the polarization separation devices 3 to 11, the illumination light may be introduced thereto from either side thereof, i.e. either from the first glass substrate 51 or 51A side or the second glass substrate 52 or 52A side thereof. However, with the polarization separation devices 3 to 7, in which the diffractive optical element 54 has a flat surface (f) on one side, it is preferable to introduce the illumination light from the first glass substrate 51 or 51A side. This is because, if the illumination light is introduced from the second glass substrate 52 or 52A side, the liquid crystal 53 or the adhesive 57 disposed between the flat surface (f) and the first glass substrate 51 or 51A disturbs the polarization of the light that has just undergone polarization separation. It is preferable to make the liquid crystal 53 or the adhesive 57 disposed between the flat surface (f) and the first glass substrate 51 or 51A as thin as possible. This is because, even when the illumination light is introduced from the first glass substrate 51 or 51A side, the liquid crystal 53 or the adhesive 57, if made thick, disperses light and thereby lowers efficiency.

It is preferable that the optical members that are disposed on the exit side of the diffraction grating surface (d) be made appropriately thin. Since the illumination light that is incident on the polarization separation devices 3 to 11 is unpolarized, even if its polarization is disturbed until it reaches the diffraction grating surface (d), basically no problem results; however, if the polarization of the illumination light is disturbed in an optical member through which it passes after it has undergone polarization separation on the diffraction grating surface (d), polarization separation efficiency lowers, which makes it impossible to obtain the desired performance. One of the causes of such disturbance of polarization is the birefringence of an optical member. Even when an optical member is formed as a transparent member made of a material that is optically substantially isotropic, as the optical member is made thicker, it exerts a stronger effect of birefringence, which makes disturbance of polarization more likely. Making an optical member thin reduces the effect of its birefringence, and thus helps suppress disturbance of polarization. In addition, making an optical member thin also offers the advantage of higher transmission efficiency.

For these reasons, as described previously, the sum of the thicknesses of the optical members disposed on the exit side of the diffraction grating surface (d) is typically 0.1 to several millimeters, preferably 0.5 to 1 mm, and further preferably about 1 mm. Since the first and second glass substrates 51 or 51A and 52 or 52A account for most of the thickness of any of the polarization separation devices 3 to 11, the thickness of each of the glass substrates 51 or 51A and 52 or 52A is typically 0.1 to several millimeters, preferably 0.5 to 1 mm, and further preferably about 1 mm. The thickness of the diffractive optical element 54 or 54A is typically 10 to 200 µm, and preferably 10 to 100 µm. Making the diffractive optical element 54 or 54A thinner than any of the glass substrates 51 or 51A and 52 or 52A in this way is advantageous in preventing disturbance of polarization caused by the effect of birefringence as described above, and is thus advantageous in the resin molding process described previously. The thickness of the liquid crystal 53 disposed between the diffraction grating surface (d) and the orientation film 56 is typically 50 µm or less, preferably 1 to 30 µm, and further preferably several micrometers to 20 µm. If the thickness of the liquid crystal 53 is greater than 50 µm, it is difficult to orient the molecules of the liquid crystal 53 with the orientation film 56. This makes the orientation of the liquid crystal molecules in and around the middle portion of the layer of the liquid crystal 53 random, and thus makes it difficult to obtain the desired performance (diffraction efficiency).

It is preferable that the diffraction grating surface (d) fulfill conditional formulae (1) and (2), and in addition (3) or (4) noted previously. As described previously, fulfilling these conditional formulae (for example, np=1.52, no=1.52, ne=1.71, and Δn=0.2) helps enhance polarization separation efficiency, and makes the formation of the diffraction grating surface (d) easy. It is to be noted that here, np represents the refractive index of the diffractive optical element 54 or 54A;

no represents the refractive index for ordinary light of the liquid crystal 53; and ne represents the refractive index for extraordinary light of the liquid crystal 53.

It is preferable that the diffraction grating surface (d) additionally fulfill conditional formula (5) noted previously with respect to its grating pitch D. When one of the polarization separation devices 3 to 11 is used in an illumination optical system, fulfilling conditional formula (5) permits a compact layout and simultaneously ensures high polarization separation efficiency.

Embodiments 12 to 14: Illumination Optical Systems

Figure 20:
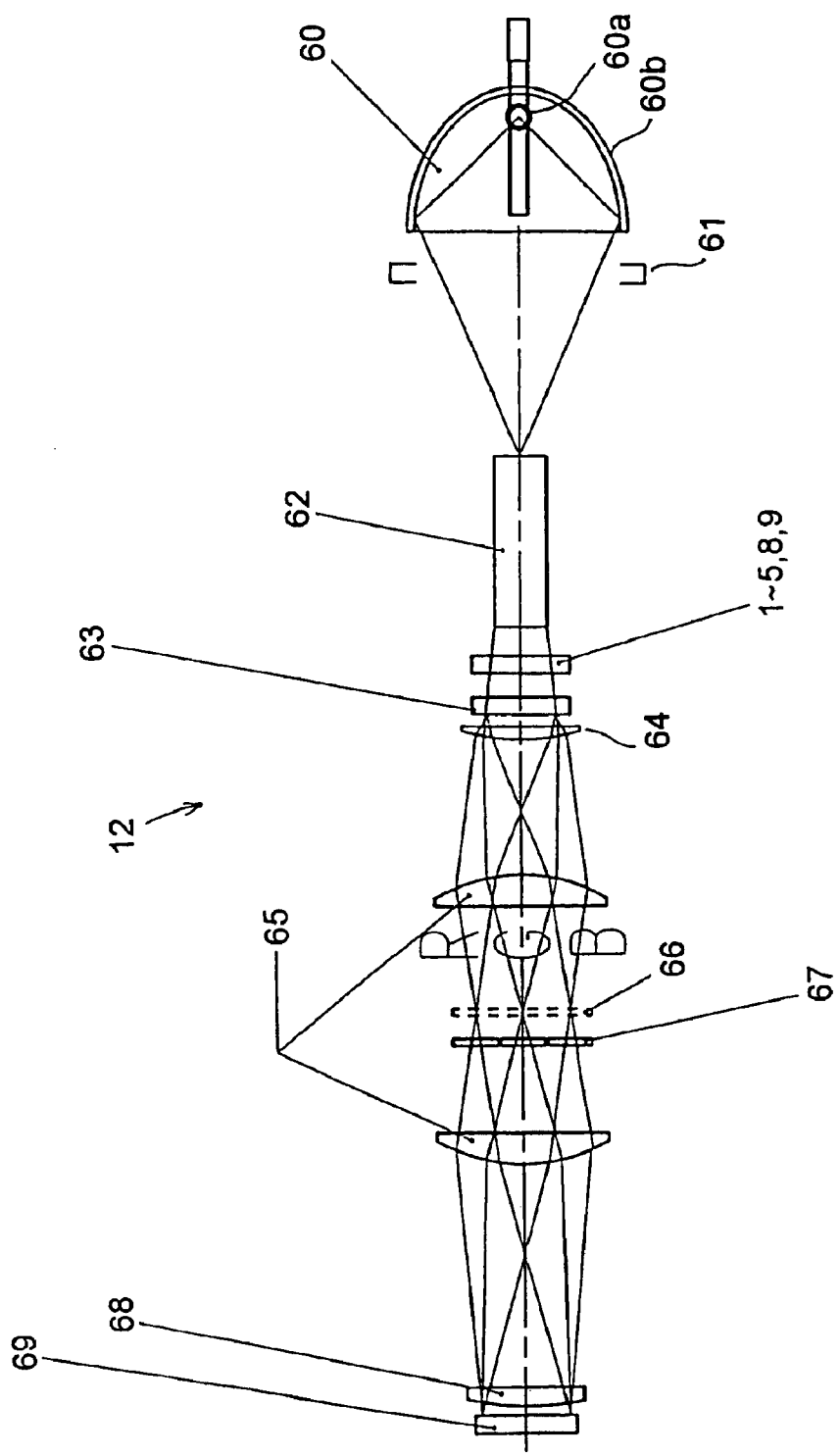
FIG. 20 is an optical construction diagram showing the illumination optical system of a twelfth embodiment of the invention, which has an integrator rod, in a sectional view along the plane of color separation optical paths.
Figure 21:
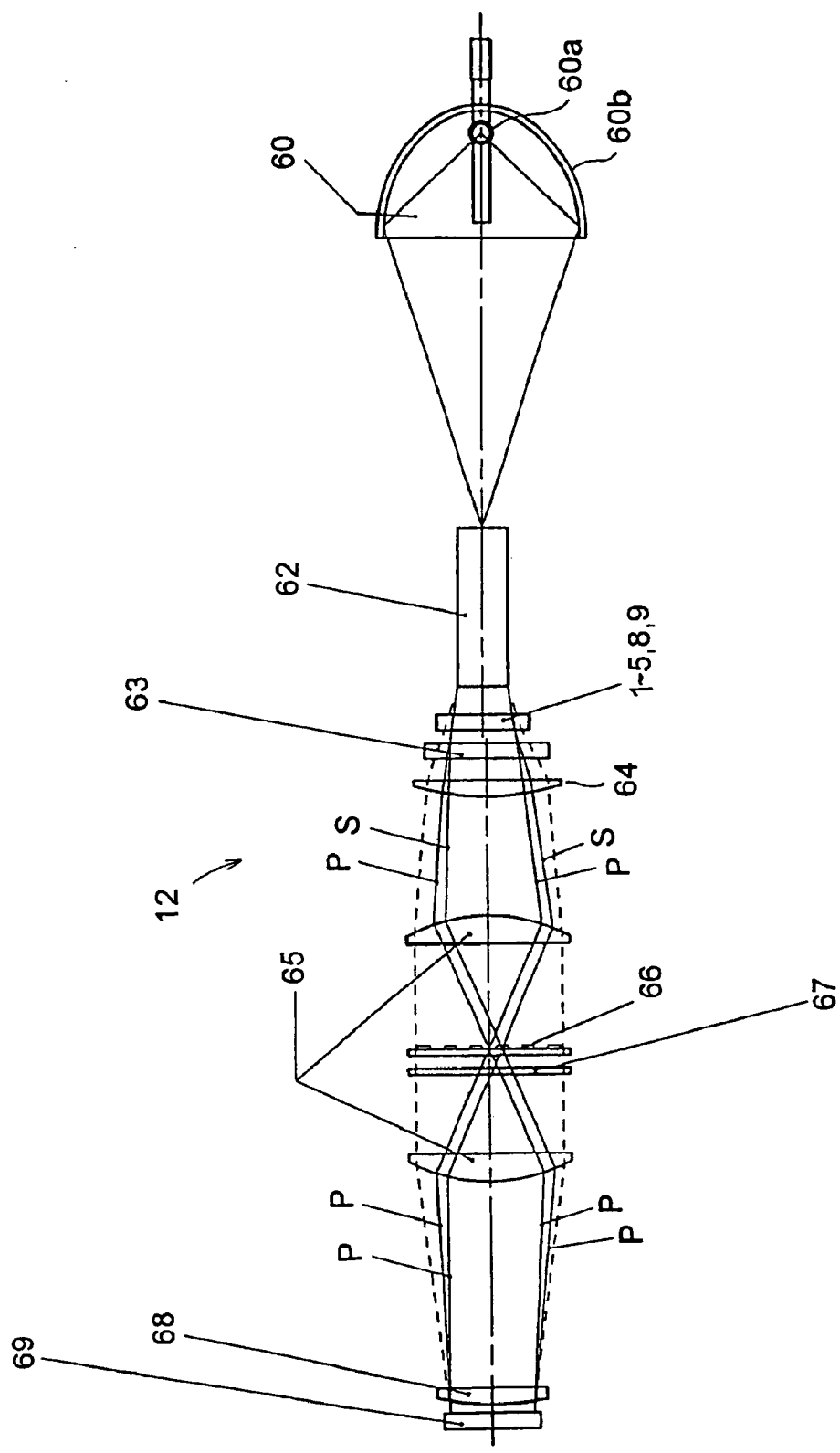
FIG. 21 is an optical construction diagram showing the illumination optical system of the twelfth embodiment in a sectional view along the plane of polarization conversion optical paths.

As a twelfth embodiment of the invention, the optical construction of an illumination optical system provided with one of the polarization separation devices 1 to 5, 8, and 9 of the first to fifth, eighth, and ninth embodiments is shown in FIGS. 20 and 21, which are, respectively, a sectional view along the plane of the color separation optical paths (i.e. as seen from above) and a sectional view along the plane of the polarization conversion optical paths (i.e. as seen from the side). This illumination optical system 12 is designed for use in a liquid crystal projector to illuminate a liquid crystal panel 69, and is provided with, in the order of arrangement along the optical path, a lamp 60, a UV (ultraviolet)/IR (infrared) cut filter 61, an integrator rod 62, a polarization separation device (one of 1 to 5, 8, and 9), a color separation hologram 63, a condenser lens 64, relay lenses 65, a half-wave plate 66, a trimming filter 67, and a field lens 68.

The lamp 60 is composed of a light source 60a for emitting illumination light and an elliptic mirror 60b for condensing the illumination light emitted from the light source 60a. The illumination light emitted from the light source 60a passes through the UV/IR cut filter 61. The provision of the UV/IR cut filter 61 is optional. By disposing the UV/IR cut filter 61 between the light source 60a and the polarization separation device (one of 1 to 5, 8, and 9), it is possible to shield ultraviolet and infrared rays, i.e. components of light other than the necessary visible light, and thereby enhance the light and heat resistance, and thus the reliability, of the polarization separation device (one of 1 to 5, 8, and 9).

The illumination light that has passed through the UV/IR cut filter 61 then enters the integrator rod 62 of a kaleidoscope type. The integrator rod 62 is a solid polygonal prism made of glass, or a hollow polygonal prism composed of a plurality of mirrors combined together. The illumination light that has entered the integrator rod 62 is reflected repeatedly on the side surfaces thereof, and thereby the spatial energy distribution (i.e. illuminance distribution) of the illumination light is made uniform. The exit-side end surface of the integrator rod 62 is located to be conjugate with the display surface of the liquid crystal panel 69, and this makes it possible to illuminate the display surface of the liquid crystal panel 69 efficiently and uniformly.

The illumination light that has exited from the integrator rod 62 then enters the polarization separation device (one of 1 to 5, 8, and 9). The polarization separation device (one of 1 to 5, 8, and 9) separates the illumination light that has exited from the integrator rod 62 into P-polarized and S-polarized light components that have mutually perpendicular polarization planes. Through this polarization separation, the P-polarized light component is transmitted intact through the polarization separation device (one of 1 to 5, 8, and 9) without being diffracted by the diffraction grating surface (d), and the S-polarized light component is deflected by being diffracted by the diffraction grating surface (d). As a result of this polarization separation, the P- and S-polarized light components are imaged (i.e. made to form the image of the light source) at different spots that are apart from each other in a direction perpendicular to the optical axis. The P- and S-polarized light components that have exited from the polarization separation device (one of 1 to 5, 8, and 9) are then subjected to color separation by the color separation hologram 63 so that the components of different colors R, G, and B thereof exit from the color separation hologram 63 at different angles and then enter the condenser lens 64 so as to be condensed. Here, color separation may be achieved by the use of instead of the color separation hologram 63, a diffractive optical device of any other type (for example, a surface-relief type), a color wheel, a dichroic mirror, or the like.

The illumination light that has passed through the condenser lens 64 then enters the relay lenses 65. The two relay lenses 65 relay the illumination light in such a way that the exit-side end surface of the integrator rod 62 is conjugate with the display surface of the liquid crystal panel 69. In the vicinity of the aperture stop position of the relay lenses 65 (or in the vicinity of the position conjugate with the aperture stop), the half-wave plate 66 is disposed, as a polarization plane rotating means, to permit only the S-polarized light component to enter it. In the vicinity of the aperture stop position of the relay lenses 65, the S-polarized and P-polarized light components are imaged at different spots that are apart from each other, and this makes it possible to permit only the S-polarized light component to enter the half-wave plate 66. The half-wave plate 66 rotates the polarization plane of the S-polarized light component through about 90° so that the light that exits from the relay lenses 65 is uniformly polarized. Through this rotation of the polarization plane, the S-polarized light component is converted into P-polarized light, and thus the whole illumination light becomes uniformly P-polarized. By using a half-wave plate 66 as a polarization plane rotating means in this way, it is possible to achieve rotation of a polarization plane cheaply.

Figure 48:
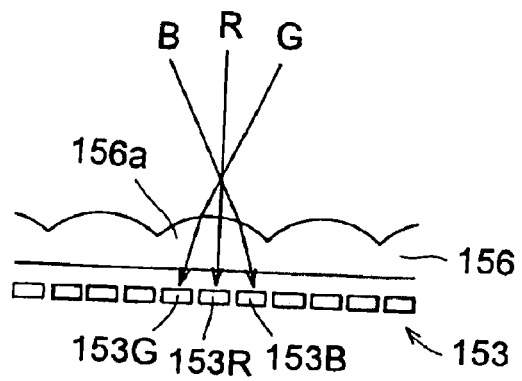
FIG. 48 is a diagram showing the structure of an LCD provided with a microlens array and illuminated with R, G, and B light components that travel along different optical paths that run at an angle to one another.

The illumination light, now uniformly P-polarized, passes through, in addition to the relay lenses 65, the trimming filter 67 for enhancing color purity and the field lens 68 for condensation, and then illuminates the liquid crystal panel 69, which is a spatial light modulation device. The liquid crystal panel 69 has a polarizer (not shown) so arranged as to transmit the P-polarized light component, and therefore almost no light is lost through the polarizer. This makes it possible to illuminate the liquid crystal panel 69 with high light use efficiency. Moreover, the R, G, and B components of the illumination light strike the liquid crystal panel 69 from different angles, and are directed by a microlens array (such as shown in FIG. 48) disposed on the illumination light entrance side of the liquid crystal panel 69 so as to illuminate pixels of the corresponding colors R, G, and B. This makes it possible to achieve full-color display with a single panel. Since full-color display is possible as long as light components of different colors enter the microlens array of the liquid crystal panel 69 at different angles, it is possible to achieve similar illumination by performing color separation by the use of three dichroic surfaces instead of the color separation hologram 63.

Since the polarization separation device (one of 1 to 5, 8, and 9) exhibits little dependence on the angle of incidence, it performs polarization separation with high efficiency even on light that enters it at a large angle of incidence. High polarization conversion efficiency helps achieve high light use efficiency, and thus it is possible to illuminate the liquid crystal panel 69 brightly. Moreover, combining the polarization separation device (one of 1 to 5, 8, and 9) with the half-wave plate 66 makes it possible to achieve polarization conversion cheaply. By contrast, a polarization separation means, such as a PBS (polarizing beam splitter), that exhibits much dependence on the angle of incidence does not match well with the integrator rod 62, which makes the illumination light exit therefrom at a large angle. Thus, combining a PBS with the integrator rod 62 makes it difficult to perform polarization separation with high efficiency. Low polarization separation efficiency leads to low polarization conversion efficiency, and thus it is impossible to improve light use efficiency.

In a display device of a single panel type that employs a reflective liquid crystal panel capable of being driven at high speed, polarization conversion is particularly necessary to secure brightness. On the other hand, in a display device that adopts a color sequential method (in which colors R, G, and B are switched sequentially by the use of a color wheel or the like), a light-condensing portion, like the exit of the integrator rod 62, is necessary to arrange the color wheel. A combination of an integrator rod 62 and a polarization separation device (one of 1 to 5, 8, and 9), like that shown in FIG. 20, makes it possible to realize a compact construction that offers sufficient brightness and that permits adoption of a color sequential method.

Figure 22:
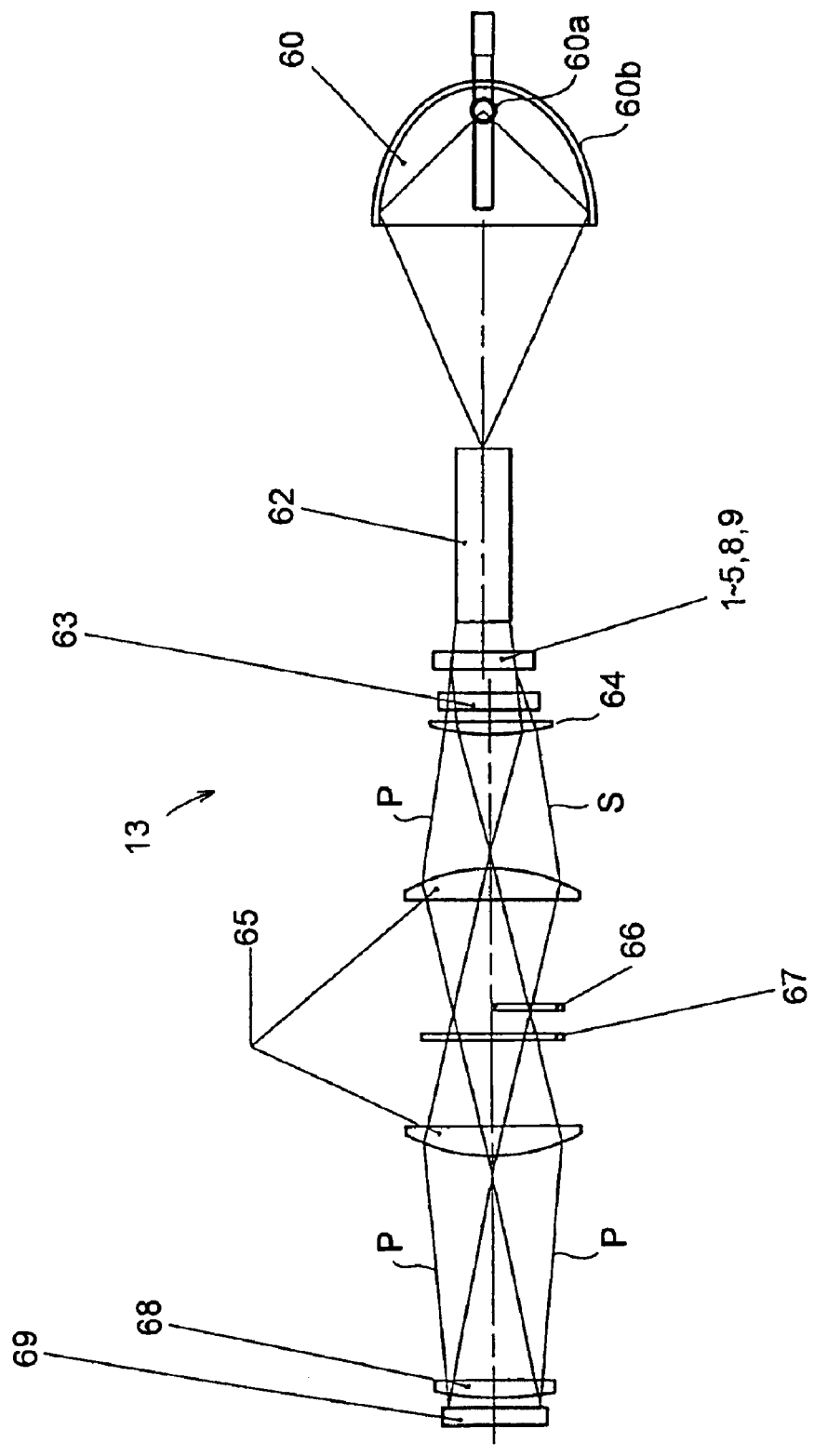
FIG. 22 is an optical construction diagram showing the illumination optical system of a thirteenth embodiment of the invention, which performs polarization conversion in a different manner than is shown in FIG. 21, in a sectional view along the plane of polarization conversion optical paths.

As a thirteenth embodiment of the invention, FIG. 22 shows the optical construction of an illumination optical system that performs polarization conversion in a different manner than is shown in FIG. 21, in a sectional view along the plane of the polarization conversion optical paths (i.e. as seen from the side). This illumination optical system 13 differs from the illumination optical system 12 shown in FIG. 21 only in that the polarization separation angle achieved by the polarization separation device (one of 1 to 5, 8, and 9) is larger (that is, the diffraction angle due to the diffraction grating surface (d) is larger), and that the half-wave plate 66 is disposed accordingly. Thus, the sectional view of this illumination optical system 13 along the plane of the color separation optical paths (i.e. as seen from above) is the same as the sectional view shown in FIG. 20. As the diffraction grating pitch is made smaller, the diffraction angle of the diffraction grating surface (d) becomes larger, and thus the whole S-polarized light component is deflected at a larger polarization separation angle. This helps increase flexibility in arranging the constituent members of the illumination optical system 13.

Figure 23:
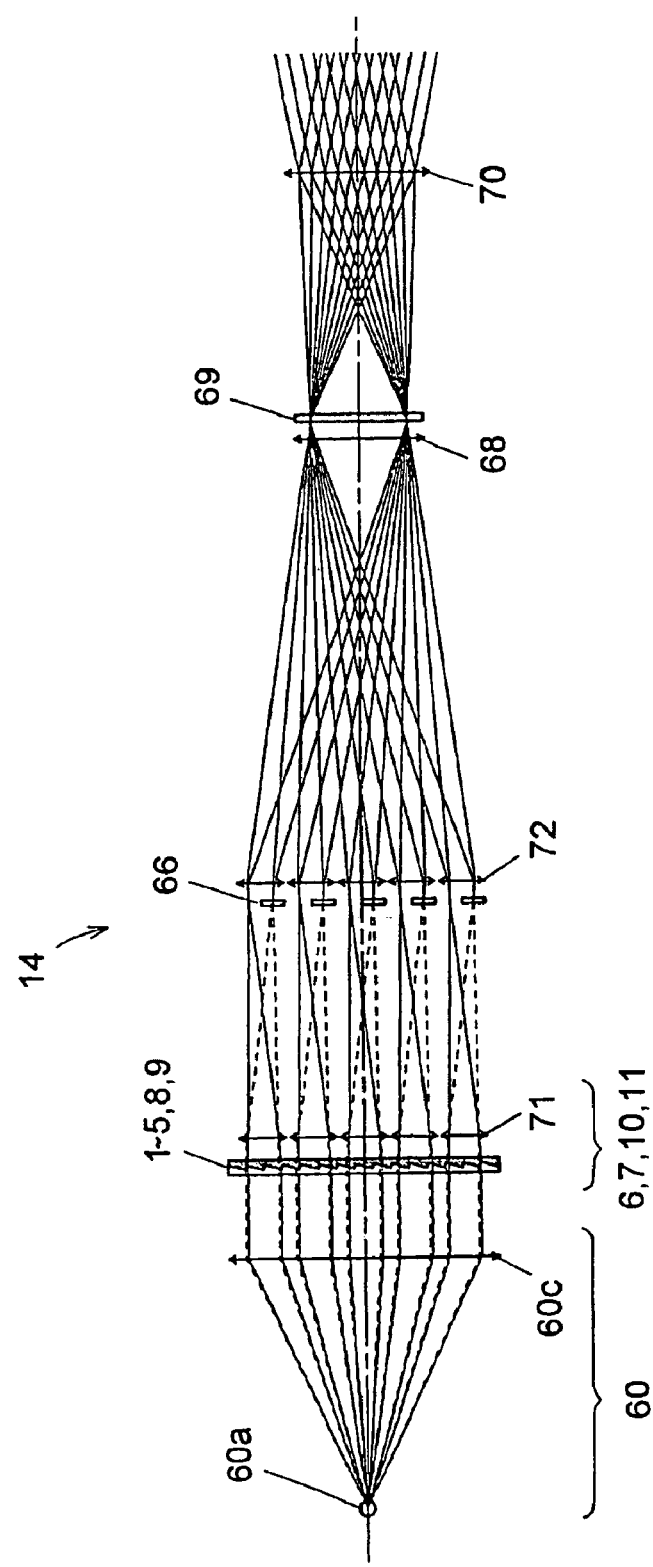
FIG. 23 is an optical construction diagram showing the illumination optical system of a fourteenth embodiment of the invention, which has an integrator of a lens array type, in a sectional view along the plane of polarization conversion optical paths.
Figure 24:
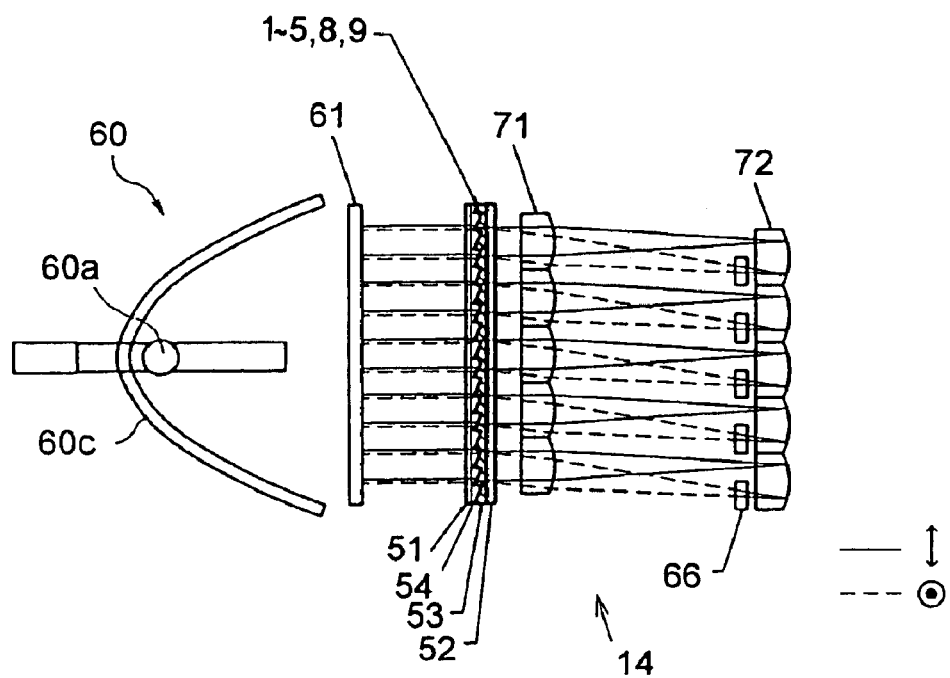
FIG. 24 is an optical sectional view showing the polarization conversion portion of the illumination optical system of the fourteenth embodiment.

As a fourteenth embodiment of the invention, FIG. 23 schematically shows the optical construction of an illumination optical system 14 having an integrator of a lens array type, in a sectional view along the plane of the polarization conversion optical paths. FIG. 24 shows, in a sectional view, the polarization conversion portion of this illumination optical system 14. This illumination optical system 14 is designed for use in a liquid crystal projector to illuminate a liquid crystal panel 69, and is provided with, in the order of arrangement along the optical path, a lamp 60, a UV/IR cut filter 61 (FIG. 24), a polarization separation device (one of 1 to 5, 8, and 9), a first lens array 71, a half-wave plate 66, a second lens array 72, and a field lens 68 (FIG. 23). Reference numeral 70 in FIG. 23 represents a projection lens for projecting the image displayed on the liquid crystal panel 69 onto the surface of a screen.

The lamp 60 is composed of a light source 60a for emitting illumination light and a paraboloidal mirror 60c for forming the illumination light emitted from the light source 60a into a substantially parallel beam. The illumination light emitted from the light source 60a passes through the UV/IR cut filter 61, and then enters the polarization separation device (one of 1 to 5, 8, and 9), where the illumination light is separated into P-polarized and S-polarized light components that have mutually perpendicular polarization planes. In FIGS. 23 and 24, solid lines represent the P-polarized light component (of which the electric vector vibrates parallel to the plane of the figures) and broken lines represent the S-polarized light component (of which the electric vector vibrates perpendicularly to the plane of the figures). Through this polarization separation, the P-polarized light component is transmitted intact through the polarization separation device (one of 1 to 5, 8, and 9) without being diffracted by the diffraction grating surface (d), and the S-polarized light component is deflected by being diffracted by the diffraction grating surface (d). As a result of this polarization separation, the P- and S-polarized light components are imaged (i.e. made to form the image of the light source) at different spots that are apart from each other in a direction perpendicular to the optical axis.

The P- and S-polarized light components that have exited from the polarization separation device (one of 1 to 5, 8, and 9) then enter the first lens array 71 disposed in the vicinity of the polarization separation device (one of 1 to 5, 8, and 9). The first lens array 71 is composed of a plurality of rectangular lens cells, geometrically similar to the liquid crystal panel 69, arranged in a two-dimensional array, and separates the light incident thereon with those lens cells. The first lens array 71 forms a plurality of light source images on the second lens array 72 having an array structure similar to that of the first lens array 71. The individual lens cells of the first lens array 71 are conjugate with the liquid crystal panel 69 through the individual lens cells of the second lens array 72. This makes the spatial energy distribution of the illumination light uniform, and thereby makes it possible to illuminate the liquid crystal panel 69 efficiently and uniformly.

In the vicinity of the second lens array 72 (or in the vicinity of the position conjugate therewith), the half-wave plate 66 is disposed, as a polarization plane rotating means, to permit only the S-polarized light component to enter it. In the vicinity of the second lens array 72, the S-polarized and P-polarized light components are imaged at different spots that are apart from each other, and this makes it possible to permit only the S-polarized light component to enter the half-wave plate 66. The half-wave plate 66 rotates the polarization plane of the S-polarized light component through about 90° so that the light that exits from the relay lenses second lens array 72 is uniformly polarized. Through this rotation of the polarization plane, the S-polarized light component is converted into P-polarized light, and thus the whole illumination light becomes uniformly P-polarized. By using a half-wave plate 66 as a polarization plane rotating means in this way, it is possible to achieve rotation of a polarization plane cheaply.

In the illumination optical systems shown in FIGS. 23 and 24, instead of the polarization separation device (one of 1 to 5, 8, and 9) and the first lens array 71, it is also possible to use one of the polarization separation devices (6, 7, 10, and 11) described previously. These polarization separation devices (6, 7, 10, and 11) have the first or second glass substrate (51 or 52) and the first lens array 71 formed integrally. This integration helps omit one glass plate and thereby reduce the cost. In addition, it is also possible to reduce the number of reflecting surfaces, and thus the number of anti-reflection coatings to be applied thereto, specifically by two, and thereby enhance light use efficiency and further reduce the cost.

Embodiments 15 and 16: Blazed Grating Devices

Figure 25:
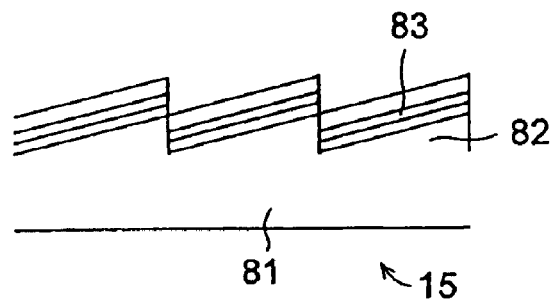
FIG. 25 is a sectional view schematically showing the structure of the blazed grating device of a fifteenth embodiment of the invention.
Figure 26:
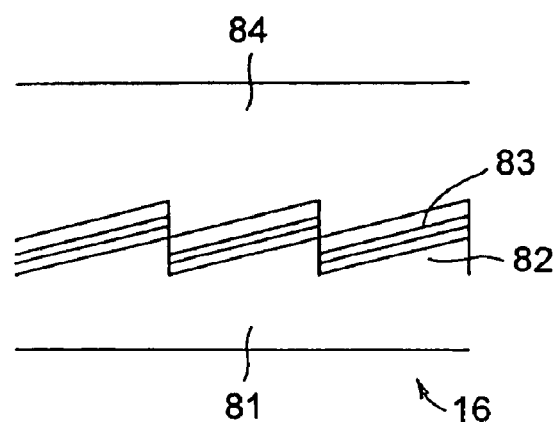
FIG. 26 is a sectional view schematically showing the structure of the blazed grating device of a sixteenth embodiment of the invention.

FIGS. 25 and 26 schematically show the basic structures of the blazed grating devices of a fifteenth and a sixteenth embodiment, respectively, of the present invention. FIG. 25 shows a most simply structured blazed grating device 15, with a blazed grating 82 formed on the surface of a transparent substrate 81 having the shape of a flat plate and a separation coating 83 formed on top of the blazed grating 82. The transparent substrate 81 is formed out of, for example, resin or glass.

When the blazed grating 82 is so shaped that the difference in height between its peaks and troughs is about equal to the wavelength of light, the blazed grating 82 functions as a diffraction grating, and thus the blazed grating device 15 functions as a diffraction grating device. When the blazed grating 82 is so shaped that the difference in height between its peaks and troughs is several times or more as great as the wavelength of light, the blazed grating 82 functions as a Fresnel lens surface, and thus the blazed grating device 15 functions as a Fresnel lens or a powered thin mirror.

FIG. 26 shows a blazed grating device 16 that additionally has a transparent member 84 having the shape of a flat plate and kept in intimate contact with the blazed grating 82 with the separation coating 83 sandwiched in between. The transparent member 84 also is formed out of resin or glass. The transparent substrate 81 and the transparent member 84 may be formed out of the same material, or may be formed out of different materials. In the blazed grating device 16, protection is provided for the blazed grating 82 and the separation coating 83.

The separation coating 83 reflects or transmits the light incident thereon according to the properties of the light. Examples of the properties of the incident light include the wavelength, the direction of the polarization plane (for linearly polarized light), the direction of rotation (for circularly polarized light), the angle of incidence relative to the separation coating 83, etc.

In the blazed grating device 15, the blazed grating 82 acts on both the light transmitted through the separation coating 83 and the light reflected from the separation coating 83. That is, the blazed grating 82 diffracts or refracts the light transmitted, and diffracts, or reflects at an angle of reflection different from the angle of incidence, the light reflected.

In the blazed grating device 16, if the transparent substrate 81 and the transparent member 84 have different refractive indices, the blazed grating 82, just as in the blazed grating device 15, acts on both the light transmitted through the separation coating 83 and the light reflected from the separation coating 83. On the other hand, if the transparent substrate 81 and the transparent member 84 have equal refractive indices, the blazed grating 82 acts only on the light reflected; that is, the blazed grating device 16 simply acts as a transparent plane-parallel plate to the light transmitted.

Embodiments 17 to 22: Diffractive Optical Devices

Figure 27:
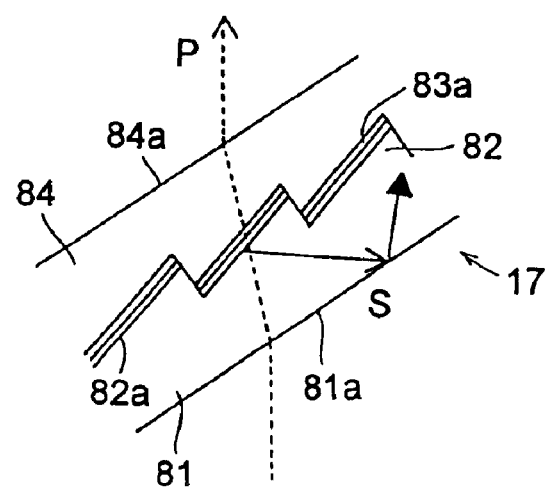
FIG. 27 is a sectional view schematically showing the structure of the optical device of a seventeenth embodiment of the invention and its action on light.

Hereinafter, examples will be described in which the blazed grating device 16 is employed as a diffractive optical device. FIG. 27 schematically shows the structure of the optical device 17 of a seventeenth embodiment of the invention and its action on light. The optical device 17 is provided with a PBS film 83*a* as the separation coating 83. The PBS film 83*a* is so formed as to transmit P-polarized light and reflect S-polarized light. The transparent substrate 81 and the transparent member 84 both have a refractive index of 1.62, and the blazed grating 82 has a blazing angle (the angle that the individual blaze surfaces 82*a* form with the plane of the blazed grating as a whole) of 30°.

When in use, the optical device 17 is so arranged that light is incident on the transparent substrate 81 at an angle of incidence of 25°. The light that has entered the transparent substrate 81 at an angle of incidence of 25° is refracted so as to be incident on the blaze surfaces 82*a* at an angle of incidence of 45°. Out of the light that has struck the blaze surfaces 82*a*, the polarized light component that is P-polarized with respect to the PBS film 83*a* is transmitted through the PBS film 83*a*, is then transmitted through the transparent member 84, and exits from the optical device 17. This light then travels along an optical path that is parallel to but slightly deviated from the optical path of the light before its entrance into the optical device 17.

The polarized light component that is S-polarized with respect to the PBS film 83*a* is reflected from the PBS film 83*a*, and is then diffracted by the blazed grating 82. The light thus reflected and diffracted strikes the surface 81*a* of the transparent substrate 81 at an angle of incidence greater than the critical angle, and is thus totally reflected therefrom. Most of the light thus totally reflected from the surface 81*a* is then reflected from the blaze surfaces 82*a*, and the remainder of the light, which is transmitted between adjacent blaze surfaces 82*a*, is then totally reflected from the surface 84*a* of the transparent member 84. These light beams are then reflected repeatedly from the surface 81*a* of the transparent substrate 81, from the blaze surfaces 82*a*, and from the surface 84*a* of the transparent member 84 until they eventually reach the end surface of the optical device 17 and exit from the optical device 17 through the end surface.

With this optical device 17, it is possible to extract the polarized light component that is P-polarized with respect to the PBS film 83*a* with almost no change in its travel path, and direct the polarized light component that is S-polarized with respect to the PBS film 83*a* in an utterly different direction so as to be discarded. Moreover, since the optical device 17 does not absorb heat, it does not become hot.

Figure 28:
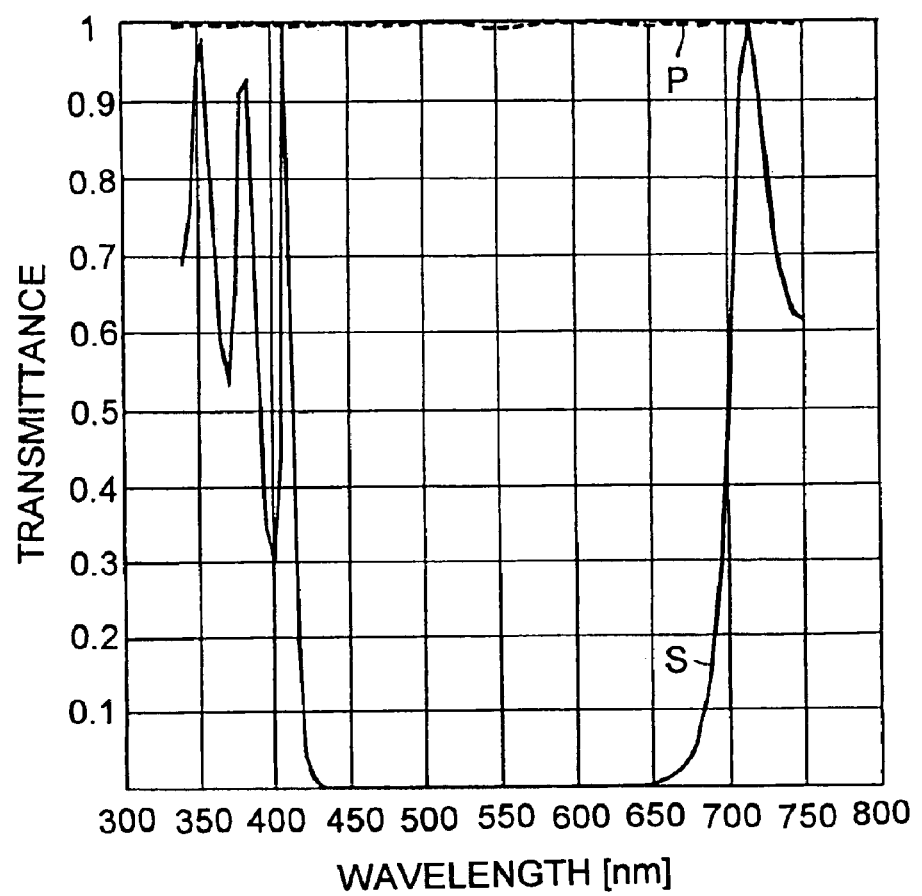
FIG. 28 is a diagram showing the relationship between the transmittance of the PBS film provided in the optical device of the seventeenth embodiment and the wavelength of the light incident thereon at an angle of incidence of 45°, plotted separately for P-polarized and S-polarized light components.

Table 2 shows the film configuration of the PBS film 83*a*, and FIG. 28 shows the relationship between its transmittance and the wavelength of the light incident thereon at an angle of incidence of 45°, plotted separately for P-polarized and S-polarized light. In Table 2, the layer numbered 0 is the transparent substrate 81, and the layer numbered 18 is the transparent member 84. The optical film thicknesses are given with respect to a reference wavelength of 745 nm.

TABLE 2

Configuration of PBS Film 83a

| Layer | Refractive Index | Optical Film Thickness | Layer | Refractive Index | Optical Film Thickness |
|---|---|---|---|---|---|
| 18 | 1.62 | | 17 | 1.62 | 0.125 |
| 16 | 1.385 | 0.125 | 15 | 2.05 | 0.25 |
| 14 | 1.385 | 0.25 | 13 | 2.05 | 0.25 |
| 12 | 1.385 | 0.25 | 11 | 2.05 | 0.25 |
| 10 | 1.385 | 0.25 | 9 | 2.05 | 0.25 |
| 8 | 1.385 | 0.25 | 7 | 2.05 | 0.25 |
| 6 | 1.385 | 0.25 | 5 | 2.05 | 0.25 |
| 4 | 1.385 | 0.25 | 3 | 2.05 | 0.25 |
| 2 | 1.385 | 0.125 | 1 | 1.62 | 0.125 |
| 0 | 1.62 | | | | |

Figure 29:
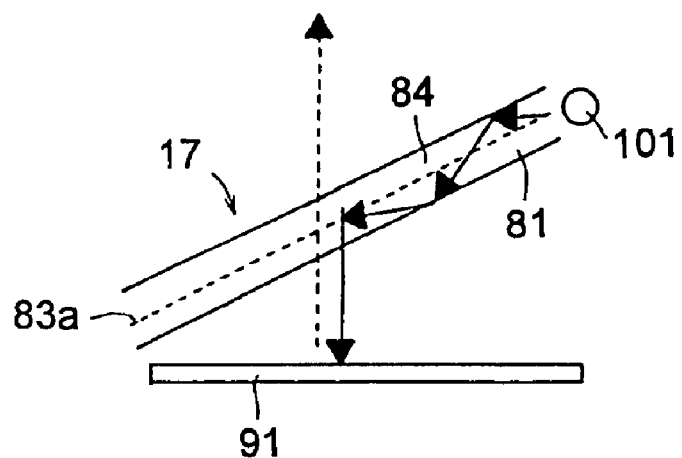
FIG. 29 is a sectional view showing a case in which the optical device of the seventeenth embodiment is used as an illumination optical system for a reflective LCD.

FIG. 29 shows a case in which the optical device 17 is used as an illumination optical system for a reflective LCD. The optical device 17 is arranged at 25° relative to the LCD 91, and a linear light source 101 is arranged in the vicinity of the end surface of the optical device 17. The light source 101 emits unpolarized light. The light emitted from the light source 101 enters the optical device 17 through its end surface, and then travels inside the optical device 17 by being totally reflected. Out of the light that travels inside the optical device 17, the polarized light component that is S-polarized with respect to the PBS film 83*a* is reflected from the PBS film 83*a*, and thereby has its angle of incidence with respect to the surface 81*a* of the transparent substrate 81 changed gradually until, when the angle of incidence becomes smaller than the critical angle, eventually transmitted through the surface 81*a*. The light transmitted through the surface 81*a* then strikes, as illumination light, the LCD 91 at an angle of incidence of approximately 90°.

The LCD 91 is controlled in such a way that a linearly polarized light component whose polarization plane has been rotated through 90° by modulation represents an image. The light modulated by and reflected from the LCD 91 enters the transparent substrate 81 at an angle of incidence of approximately 25°. Out of the light that has entered the optical device 17, the polarized light component that represents the image is P-polarized with respect to the PBS film 83*a*, and is thus transmitted through the PBS film 83*a* so as to exit from the optical device 17 through the transparent member 84. On the other hand, the other polarized light component is S-polarized with respect to the PBS film 83*a*, and is thus reflected from the PBS film 83*a* so as to travel toward the end surface of the optical device 17 by being totally reflected as described above and eventually exit from the optical device 17 toward the light source 101.

The distance, as measured in the direction perpendicular to the LCD 91, of the space occupied by the optical device 17 is 0.47 (tan 25°) times as great as the beam width of the light reflected from the LCD 91, i.e. less than half of the corresponding distance required by a conventional PBS prism. In an image display apparatus of a projection type that projects light representing an image onto a screen, this helps greatly reduce the back-focal length of a projection optical system and thereby make the projection optical system compact.

Figure 30:
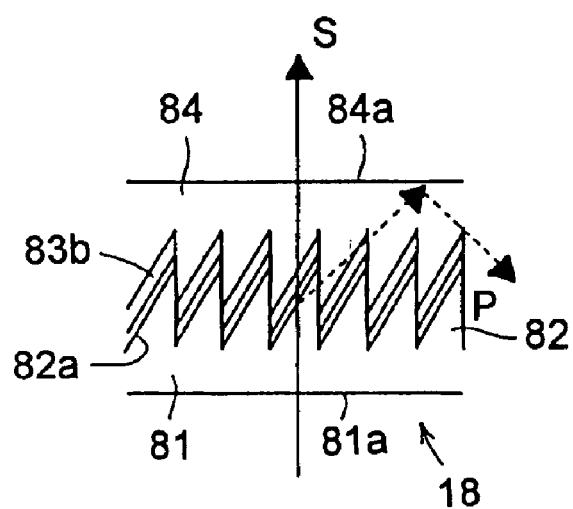
FIG. 30 is a sectional view schematically showing the structure of the optical device of an eighteenth embodiment of the invention and its action on light.

FIG. 30 schematically shows the structure of the optical device 18 of an eighteenth embodiment of the invention and its action on light. This optical device 18 is provided with a PBS film 83b as the separation coating 83. Here, contrary to the seventeenth embodiment, the PBS film 83b is so formed as to reflect P-polarized light and transmit S-polarized light. The transparent substrate 81 and the transparent member 84 both have a refractive index of 1.87, and the blazed grating 82 has a blazing angle of 60°.

When in use, the optical device 18 can be arranged in such a way that light enters the transparent substrate 81 at an angle of incidence of 0°. The light that has entered the transparent substrate 81 then travels straight and strikes the blaze surfaces 82a at an angle of incidence of 60°. Out of the light that has struck the blaze surfaces 82a, the polarized light component that is S-polarized with respect to the PBS film 83b is transmitted through the PBS film 83b, is then transmitted through the transparent member 84, and exits from the optical device 18. This light then travels along an extension line of the optical path of the light before its entrance into the optical device 18.

The polarized light component that is P-polarized with respect to the PBS film 83b is reflected from the PBS film 83b, and is diffracted by the blazed grating 82. The light thus reflected and diffracted strikes the surface 84a of the transparent member 84 at an angle of incidence greater than the critical angle, and is thus totally reflected so as to eventually reach the end surface of the optical device 18 and exit from the optical device 18 through the end surface as in the seventeenth embodiment.

Figure 31:
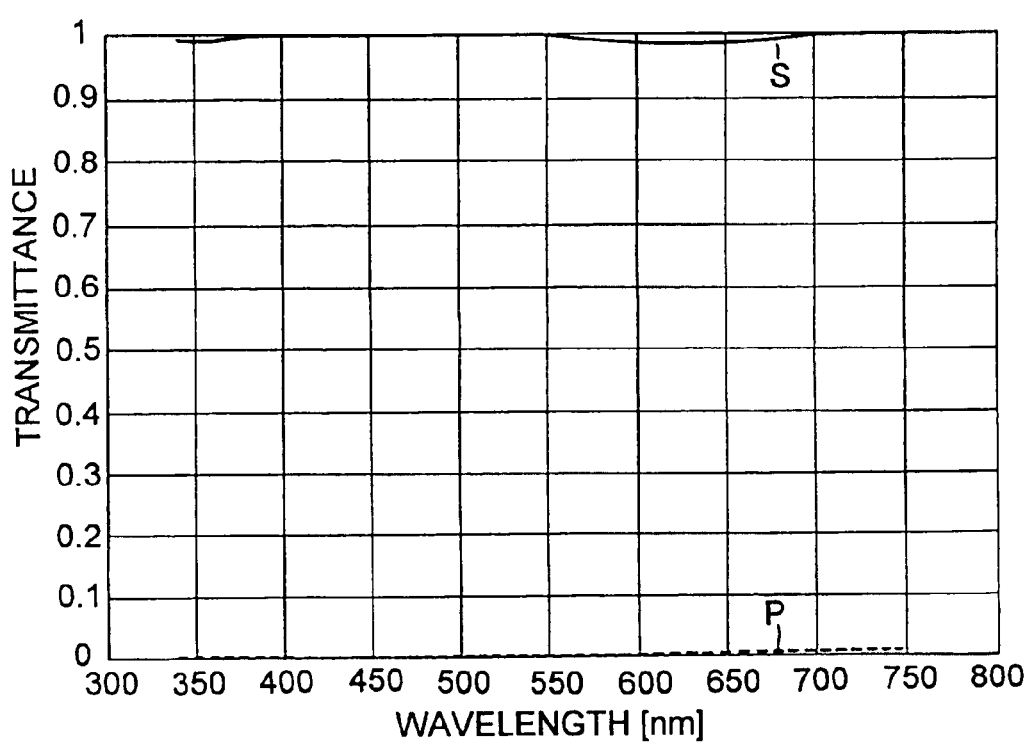
FIG. 31 is a diagram showing the relationship between the transmittance of the PBS film provided in the optical device of the eighteenth embodiment and the wavelength of the light incident thereon at an angle of incidence of 60°, plotted separately for P-polarized and S-polarized light components.

Table 3 shows the film configuration of the PBS film 83b, and FIG. 31 shows the relationship between its transmittance and the wavelength of the light incident thereon at an angle of incidence of 60°, plotted separately for P-polarized and S-polarized light. In Table 3, the layer numbered 0 is the transparent substrate 81, and the layer numbered 26 is the transparent member 84. The optical film thicknesses are given with respect to a reference wavelength of 280 nm.

TABLE 3

Configuration of PBS Film 83b

| Layer | Refractive Index | Optical Film Thickness | Layer | Refractive Index | Optical Film Thickness |
|---|---|---|---|---|---|
| 26 | 1.87 |  | 25 | 1.385 | 0.125 |
| 24 | 2.3 | 0.25 | 23 | 1.385 | 0.25 |
| 22 | 2.3 | 0.25 | 21 | 1.385 | 0.25 |
| 20 | 2.3 | 0.25 | 19 | 1.385 | 0.25 |
| 18 | 2.3 | 0.25 | 17 | 1.385 | 0.25 |
| 16 | 2.3 | 0.25 | 15 | 1.385 | 0.25 |
| 14 | 2.3 | 0.25 | 13 | 1.385 | 0.25 |
| 12 | 2.3 | 0.25 | 11 | 1.385 | 0.25 |
| 10 | 2.3 | 0.25 | 9 | 1.385 | 0.25 |
| 8 | 2.3 | 0.25 | 7 | 1.385 | 0.25 |
| 6 | 2.3 | 0.25 | 5 | 1.385 | 0.25 |
| 4 | 2.3 | 0.25 | 3 | 1.385 | 0.25 |
| 2 | 2.3 | 0.25 | 1 | 1.385 | 0.125 |
| 0 | 1.87 |  |  |  |  |

Like the optical device 17 of the seventeenth embodiment, the optical device 18 can be used as an illumination optical system for a reflective LCD. In that case, since the optical device 18 can be arranged parallel to the LCD, the distance required in the direction perpendicular to the LCD to arrange the optical device 18 is very short.

Figure 32:
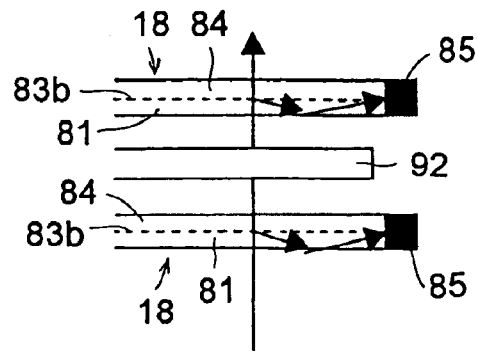
FIG. 32 is a sectional view showing a case in which the optical device of the eighteenth embodiment is used as an illumination optical system for a transmissive LCD and as an optical system for extracting light representing an image.

FIG. 32 shows a case in which the optical device 18 is used as an illumination optical system for a transmissive LCD and as an optical system for selectively extracting light that represents an image. Two optical devices 18 are arranged respectively in front of and behind the LCD 92, and the light from a light source is shone on one of the optical devices 18 from the direction substantially perpendicular thereto. Out of the light that has entered the optical device 18, the polarized light component that is S-polarized with respect to the PBS film 83b is transmitted through the optical device 18, and then strikes, as illumination light, the LCD 92 at an angle of 90°. On the other hand, the polarized light component that is P-polarized with respect to the PBS film 83b is reflected so as to travel inside the optical device 18, by being totally reflected, and eventually reach the end surface. On the end surface of the optical device 18 is fitted a light-absorbing member 85, which absorbs the light that has reached the end surface.

The LCD 92 is controlled in such a way that a linearly polarized light component whose polarization plane has not been rotated by modulation represents an image. The light transmitted through the LCD 92 enters the other optical device 18, and the polarized light component that is S-polarized with respect to the PBS film 83b is transmitted through the optical device 18. The polarized light component whose polarization plane has been rotated by 90° by modulation and which has thus turned into P-polarized light with respect to the PBS film 83b is reflected so as to travel inside the optical device 18, by being totally reflected, and eventually reach the end surface, where the light is absorbed by an light-absorbing member 85.

Conventionally, a polarizing plate is used to illuminate a transmissive LCD and to extract light that represents an image. By using the optical device 18 instead of a polarizing plate, it is possible to obtain higher transmittance and thus bright images. Moreover, unlike a polarizing plate, the optical device 18 does not become hot, and therefore causes no ill effect on the LCD.

Figure 33:
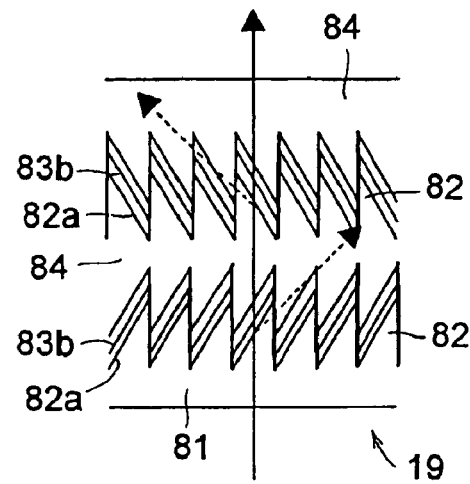
FIG. 33 is a sectional view schematically showing the structure of the optical device of a nineteenth embodiment of the invention and its action on light.

FIG. 33 schematically shows the structure of the optical device 19 of a nineteenth embodiment of the invention and its action on light. This optical device 19 is obtained by forming another blazed grating 82 on the surface of the transparent member 84 of the optical device 18 of the eighteenth embodiment, then providing another PBS film 83b as the separation coating 83 on top thereof, and then placing another transparent member 84 that is kept in close contact with the transparent member 84 with the PBS film 83b sandwiched in between. That is, the optical device 19 is structured as if two optical devices 18 are superposed on each other. Here, however, the blaze surfaces 82a of the two blazed gratings 12 are slanted in opposite directions.

In this structure, even if there is light that is transmitted directly between adjacent blaze surfaces 82a of one of the blazed gratings 82, that light can be separated with the PBS film 83b formed on the other blazed grating 82. This helps prevent angle-of-incidence-dependent lowering of separation efficiency and thereby increase flexibility in the angle at which the optical device 19 is arranged relative to the light to be separated.

Figure 34:
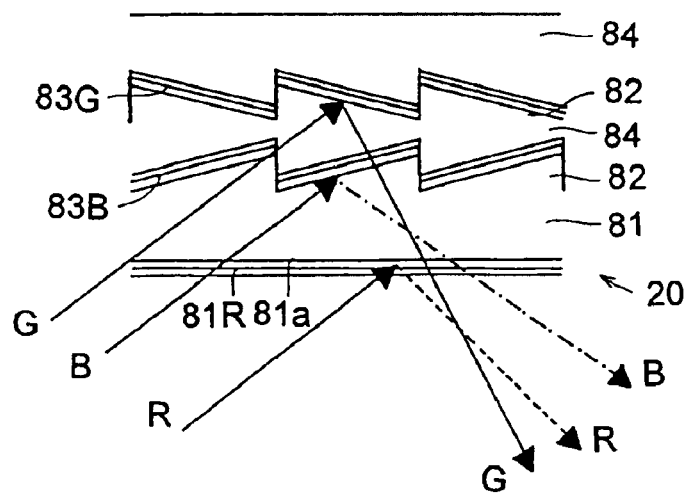
FIG. 34 is a sectional view schematically showing the structure of the optical device of a twentieth embodiment of the invention and its action on light.

FIG. 34 schematically shows the structure of the optical device 20 of a twentieth embodiment of the invention and its action on light. Like the optical device 19 of the nineteenth embodiment, this optical device 20 is provided with two sets of a blazed grating 82 and a separation coating 83. The blazed surfaces of the two blazed gratings 82 are slanted in opposite directions, and the blazing angle of the individual blazed surfaces is about several degrees. As the separation coating 83 provided on the blazed grating 82 of the transparent substrate 81, a dichroic film 83B that selectively reflects B light is provided, and, as the separation coating 83 provided on the blazed grating 82 of the transparent member 84, a dichroic film 83G that selectively reflects G light is provided. In addition, on the surface 81a of the transparent substrate 81, a dichroic film 81R that selectively reflects R light is provided.

This optical device 20 separates white light into R, G, and B light components so that the R, G, and B light components thus separated travel along different optical paths that are at an angle to one another. Out of the white light that strikes the optical device 20, the R light component is reflected from the dichroic film 81R at an angle of reflection equal to the angle of incidence. The B and G light components, which are transmitted through the dichroic film 81R, enter the optical device 20 to reach the dichroic film 83B, and is separated by the dichroic film 83B into the G light component, which is transmitted therethrough, and the B light component, which is reflected therefrom.

The B light component reflected from the dichroic film 83B is diffracted by the blazed grating 82, and then exits from the optical device 20 as light that travels at an angle to the R light. The G light transmitted through the dichroic film 83B then reaches the dichroic film 83G and is reflected therefrom so as to be diffracted by the blazed grating 82 and then exit from the optical device 20 as light that travels at an angle to the R and B light.

Tables 4, 5, and 6 show the film configurations of the dichroic films 81R, 83B, and 83G, respectively. In Table 4, the layer numbered 0 is the transparent substrate 81, and the layer numbered 22 is air. In Table 5, the layer numbered 0 is the transparent substrate 81, and the layer numbered 22 is the transparent member 84. In Table 6, the layer numbered 0 is the transparent substrate 81 side transparent member 84, and the layer numbered 22 is the surface-side transparent member 84. The optical thicknesses are given with respect to a reference wavelength of 765 nm for the dichroic film 81R, 451 nm for the dichroic film 83B, and 540 nm for the dichroic film 83G.

TABLE 4

Configuration of Dichroic Film 81R

| Layer | Refractive Index | Optical Film Thickness | Layer | Refractive Index | Optical Film Thickness |
|---|---|---|---|---|---|
| 22 | 1 |  | 21 | 1.385 | 0.14 |
| 20 | 2.3 | 0.28 | 19 | 1.47 | 0.28 |
| 18 | 2.3 | 0.26 | 17 | 1.47 | 0.25 |
| 16 | 2.3 | 0.25 | 15 | 1.47 | 0.25 |
| 14 | 2.3 | 0.25 | 13 | 1.47 | 0.25 |
| 12 | 2.3 | 0.25 | 11 | 1.47 | 0.25 |
| 10 | 2.3 | 0.25 | 9 | 1.47 | 0.25 |
| 8 | 2.3 | 0.25 | 7 | 1.47 | 0.25 |
| 6 | 2.3 | 0.25 | 5 | 1.47 | 0.25 |
| 4 | 2.3 | 0.26 | 3 | 1.47 | 0.28 |
| 2 | 2.3 | 0.28 | 1 | 1.67 | 0.14 |
| 0 | 1.52 |  |  |  |  |

TABLE 5

Configuration of Dichroic Film 83B

| Layer | Refractive Index | Optical Film Thickness | Layer | Refractive Index | Optical Film Thickness |
|---|---|---|---|---|---|
| 22 | 1.52 |  | 21 | 2.3 | 0.09 |
| 20 | 1.385 | 0.3 | 19 | 2.3 | 0.15 |
| 18 | 1.47 | 0.3 | 17 | 2.3 | 0.225 |
| 16 | 1.47 | 0.25 | 15 | 2.3 | 0.25 |
| 14 | 1.47 | 0.25 | 13 | 2.3 | 0.25 |
| 12 | 1.47 | 0.25 | 11 | 2.3 | 0.25 |
| 10 | 1.47 | 0.25 | 9 | 2.3 | 0.25 |
| 8 | 1.47 | 0.25 | 7 | 2.3 | 0.25 |
| 6 | 1.47 | 0.25 | 5 | 2.3 | 0.225 |
| 4 | 1.47 | 0.3 | 3 | 2.3 | 0.15 |
| 2 | 1.385 | 0.3 | 1 | 2.3 | 0.1 |
| 0 | 1.52 |  |  |  |  |

TABLE 6

Configuration of Dichroic Film 83G

| Layer | Refractive Index | Optical Film Thickness | Layer | Refractive Index | Optical Film Thickness |
|---|---|---|---|---|---|
| 22 | 1.52 |  | 21 | 2.3 | 0.09 |
| 20 | 1.385 | 0.3 | 19 | 2.3 | 0.15 |
| 18 | 1.47 | 0.3 | 17 | 2.3 | 0.225 |
| 16 | 1.47 | 0.25 | 15 | 2.3 | 0.25 |
| 14 | 1.47 | 0.25 | 13 | 2.3 | 0.25 |
| 12 | 1.47 | 0.25 | 11 | 2.3 | 0.25 |
| 10 | 1.47 | 0.25 | 9 | 2.3 | 0.25 |
| 8 | 1.47 | 0.25 | 7 | 2.3 | 0.25 |
| 6 | 1.47 | 0.25 | 5 | 2.3 | 0.225 |
| 4 | 1.47 | 0.3 | 3 | 2.3 | 0.15 |
| 2 | 1.385 | 0.3 | 1 | 2.3 | 0.1 |
| 0 | 1.52 |  |  |  |  |

Figure 35:
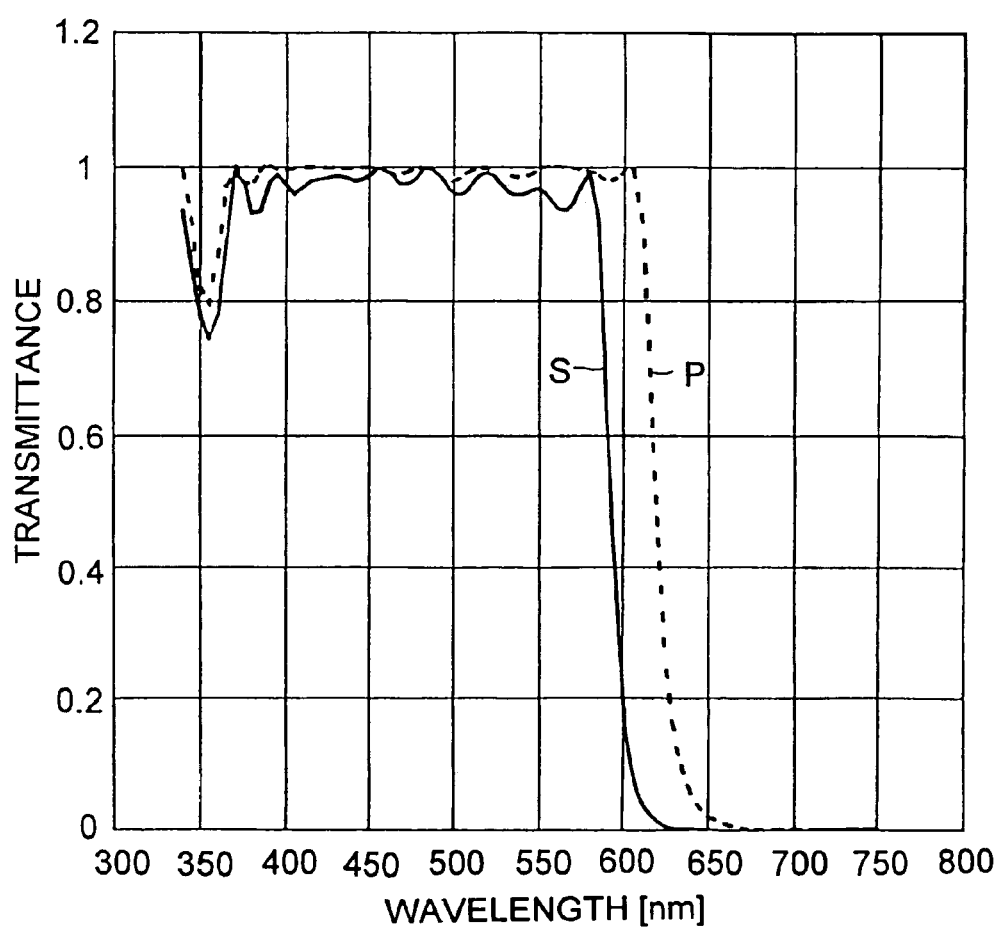
FIG. 35 is a diagram showing the relationship between the transmittance of the R light reflecting dichroic film provided in the optical device of the twentieth embodiment and the wavelength of the light incident thereon at an angle of incidence of 45°, plotted separately for P-polarized and S-polarized light components.
Figure 36:
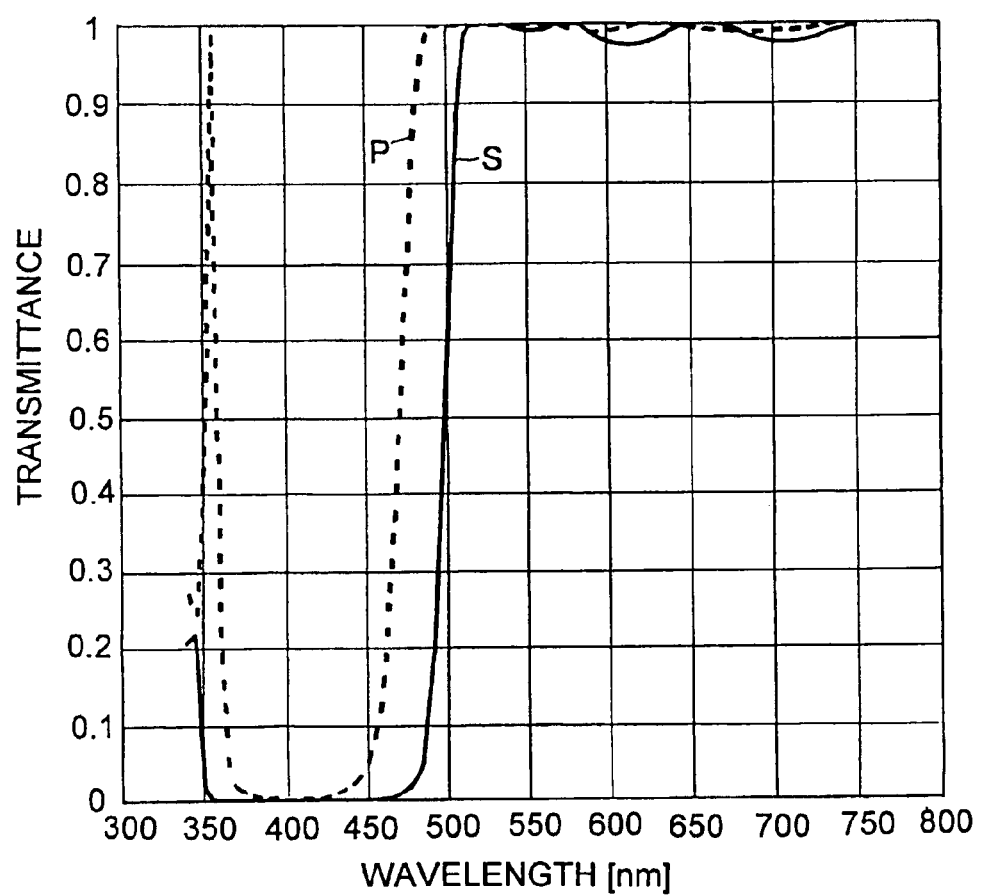
FIG. 36 is a diagram showing the relationship between the transmittance of the G light reflecting dichroic film provided in the optical device of the twentieth embodiment and the wavelength of the light incident thereon at an angle of incidence of 45°, plotted separately for P-polarized and S-polarized light components.
Figure 37:
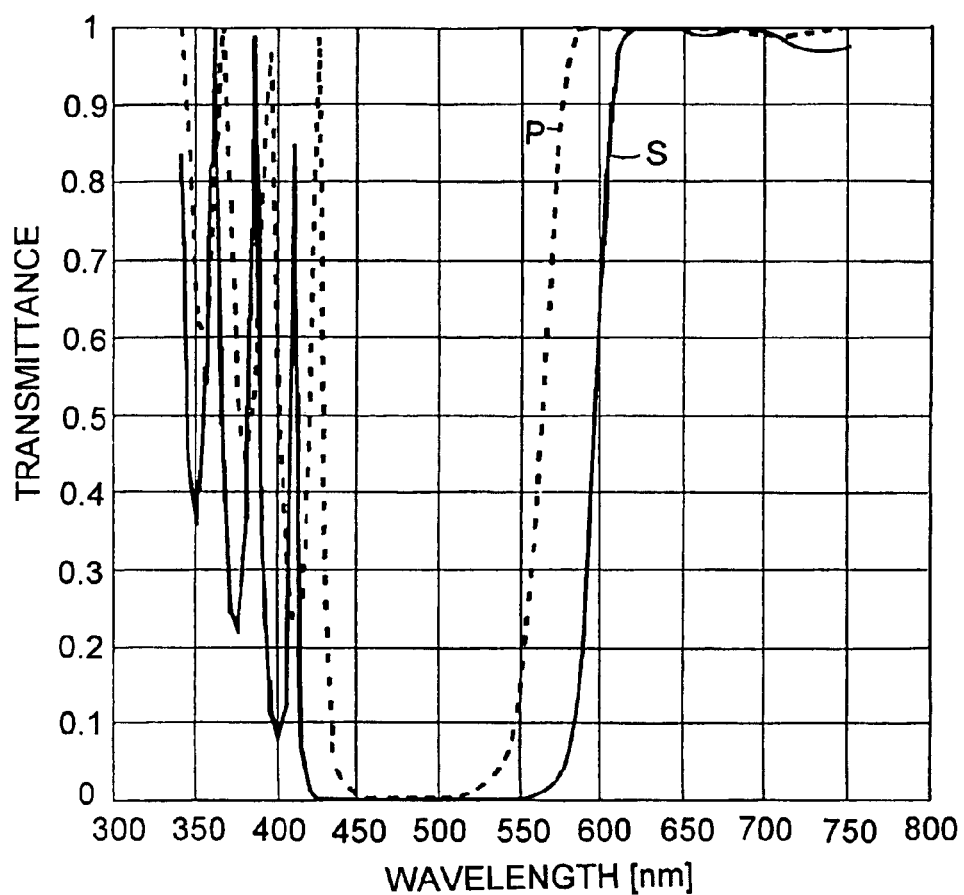
FIG. 37 is a diagram showing the relationship between the transmittance of the B light reflecting dichroic film provided in the optical device of the twentieth embodiment and the wavelength of the light incident thereon at an angle of incidence of 45°, plotted separately for P-polarized and S-polarized light components.

FIGS. 35, 36, and 37 show the relationship between the transmittance of the dichroic films 81R, 83B, and 83G, respectively, and the wavelength of the light incident thereon at an angle of incidence of 45°, plotted separately for P-polarized and S-polarized light. When light enters the transparent substrate 81, it is refracted; therefore, even when the light is shone on the dichroic film 81R at an angle of incidence of 45°, the angles of incidence at which the light actually strikes the dichroic films 83B and 83B deviate from 45°. If the blazing angle of the blazed grating 82 is assumed to be about 5°, the angles of incidence at which the light strikes the dichroic films 83B and 83G are about 32° and about 22°, respectively.

Figure 47:
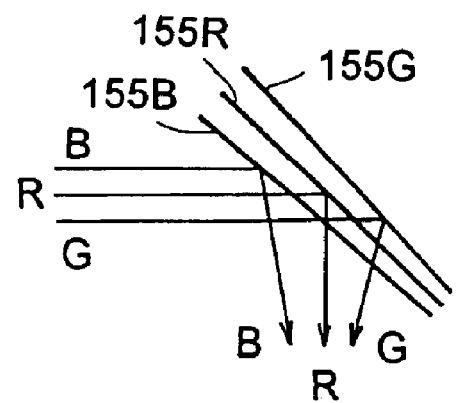
FIG. 47 is a diagram showing a conventional optical system that separates white light into R, G, and B light components that travel along different optical paths that run at an angle to one another.

The optical device 20 can be used as an illumination optical system for illuminating an LCD 53 provided with a microlens array, such as the one shown in FIG. 48. In that case, since the optical device 20 is built as one unit, using it eliminates the need to adjust the relative angles of relevant elements as in the optical system shown in FIG. 47, and thus makes quick and accurate assembly possible. To form the light directed to the LCD 53 into linearly polarized light and to extract light representing an image from the light that has been modulated by the LCD 53, it is possible to use a polarizing plate or the optical device 18 described previously.

Figure 38:
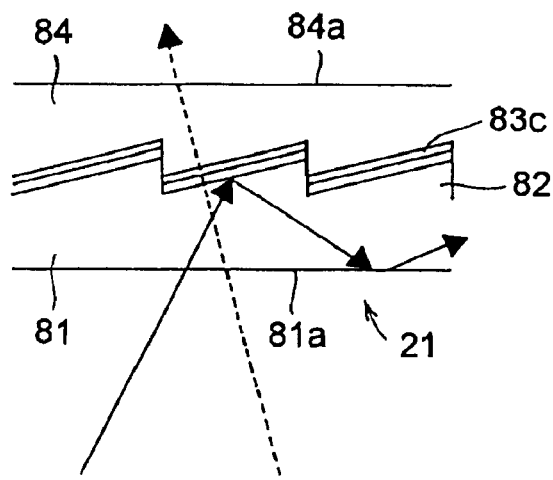
FIG. 38 is a sectional view schematically showing the structure of the optical device of a twenty-first embodiment of the invention and its action on light.

FIG. 38 schematically shows the structure of the optical device 21 of a twenty-first embodiment of the invention and its action on light. This optical device 21 is provided with, as the separation coating 83, an angle separation film 83c, which reflects or transmits light according to the angle of incidence thereof. Out of two light components that enter the optical device 21 from different directions, one is transmitted through the angle separation film 83c; the other is reflected from the angle separation film 83c, is then diffracted by the blazed grating 82, then reaches the end surface by being totally reflected, and then exits from the optical device 21.

Figure 39:
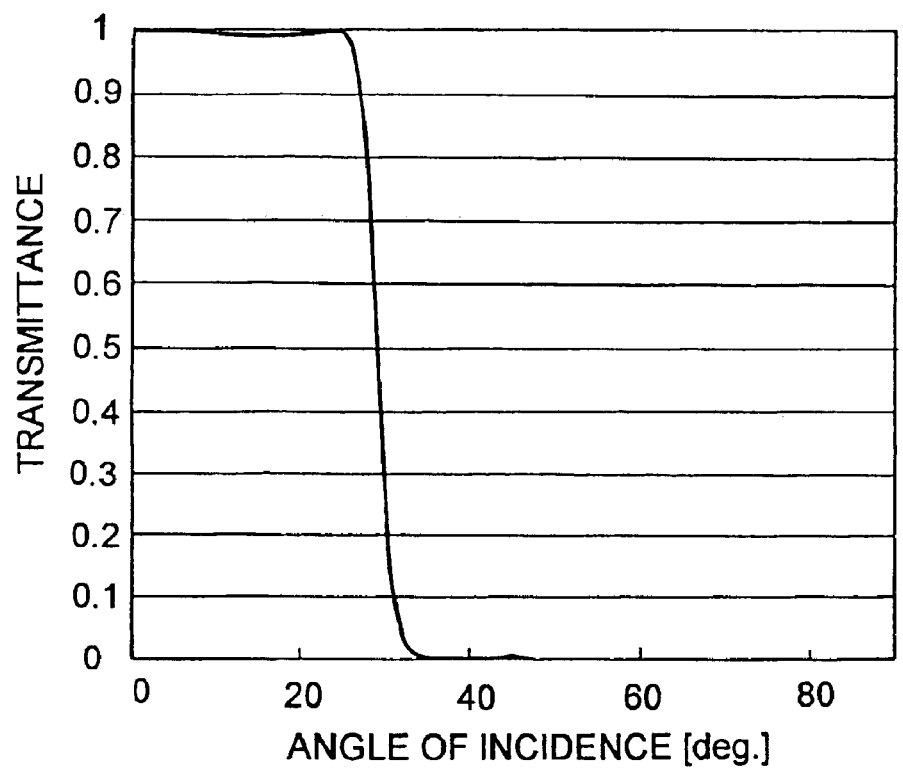
FIG. 39 is a diagram showing the relationship between the transmittance of the angle separation film provided in the optical device of the twenty-first embodiment and the angle of incidence of the light incident thereon, for light having a wavelength of 550 nm.

Table 7 shows the film configuration of the angle separation film 83c, and FIG. 39 shows the relationship between its transmittance and the angle of incidence of the light incident thereon, for light having a wavelength of 550 nm. In Table 7, the layer numbered 0 is the transparent substrate 81, and the layer numbered 22 is the transparent member 84. The optical film thicknesses are given with respect to a reference wavelength of 700 nm.

TABLE 7

Configuration of Angle Separation Film 83c

| Layer | Refractive Index | Optical Film Thickness | Layer | Refractive Index | Optical Film Thickness |
|---|---|---|---|---|---|
| 22 | 1.62 | | 21 | 1.62 | 0.125 |
| 20 | 1.385 | 0.3525 | 19 | 2.2 | 0.3125 |
| 18 | 1.385 | 0.3525 | 17 | 2.2 | 0.1175 |
| 16 | 1.385 | 0.4075 | 15 | 2.2 | 0.125 |
| 14 | 1.385 | 0.4 | 13 | 2.2 | 0.105 |
| 12 | 1.385 | 0.395 | 11 | 2.2 | 0.135 |
| 10 | 1.385 | 0.38 | 9 | 2.2 | 0.2075 |
| 8 | 1.385 | 0.3875 | 7 | 2.2 | 0.4475 |
| 6 | 1.385 | 0.3525 | 5 | 2.2 | 0.2975 |
| 4 | 1.385 | 0.295 | 3 | 2.2 | 0.3225 |
| 2 | 1.385 | 0.3475 | 1 | 1.62 | 0.125 |
| 0 | 1.62 | | | | |

Figure 40:
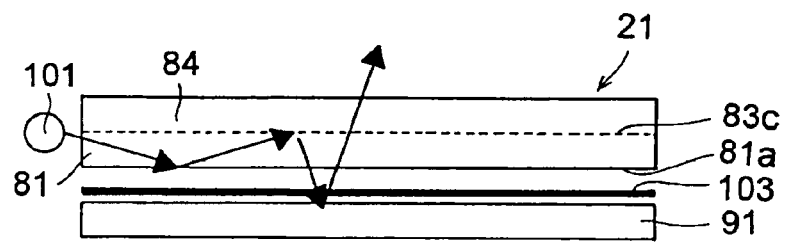
FIG. 40 is a sectional view showing a case in which the optical device of the twenty-first embodiment is used as an illumination optical system for a reflective LCD.

FIG. 40 shows a case in which the optical device 21 is used as an illumination optical system for a reflective LCD. The optical device 21 is arranged parallel to the LCD 91, and a linear light source 101 is arranged in the vicinity of the end surface of the optical device 21. Moreover, a polarizing plate 103 is arranged between the optical device 21 and the LCD 91. The light source 101 emits unpolarized light. The light emitted from the light source 101 enters the optical device 21 through its end surface, and then travels inside the optical device 21 by being totally reflected. The light that travels inside the optical device 21 is reflected from the angle separation film 83c, and thereby has its angle of incidence relative to the surface 81a of the transparent substrate 81 changed gradually until, when the angle of incidence becomes smaller than the critical angle, eventually transmitted through the surface 81a. The light transmitted through the surface 81a then strikes, as illumination light, the LCD 91 from a somewhat oblique direction. Before striking the LCD 91, this illumination light is formed into linearly polarized light by the polarizing plate 103.

The LCD 91 is controlled in such a way that a linearly polarized light component whose polarization plane has not been rotated by modulation represents an image. The light modulated by and reflected from the LCD 91 is then made to include only the light representing an image by the polarizing plate 103, and then enters, from the transparent substrate 81, the optical device 21 at an angle of incidence different from the angle at which it has exited from the transparent substrate 81. This light strikes the angle separation film 83c at a small angle of incidence, and is thus transmitted through the angle separation film 83c so as to exit from the optical device 21 through the transparent member 84. The light that has exited from the optical device 21 may be observed directly, or may be projected through a projection optical system onto a screen. Instead of the polarizing plate 103, it is also possible to use the optical device 18 described previously.

Figure 41:
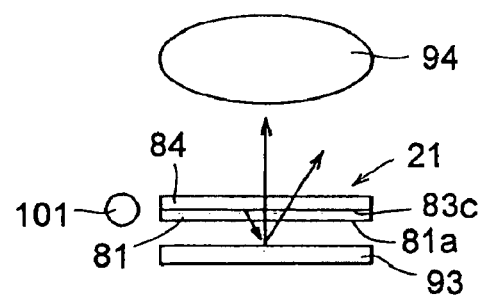
FIG. 41 is a sectional view showing a case in which the optical device of the twenty-first embodiment is used as an illumination optical system for a DMD.

FIG. 41 shows a case in which the optical device 21 is used as an illumination optical system for a DMD and the light modulated by the DMD is projected through a projection optical system. The DMD 93 is arranged perpendicularly to the optical axis of the projection optical system 94, and the optical device 21 is arranged parallel to the DMD 93 between the DMD 93 and the projection optical system 94. Moreover, a linear light source 101 is arranged in the vicinity of the end surface of the optical device 21. As in the case described above in which the LCD 91 is illuminated, the light emitted from the light source 101 enters, as illumination light, the DMD 93 from a somewhat oblique direction.

Figure 49:
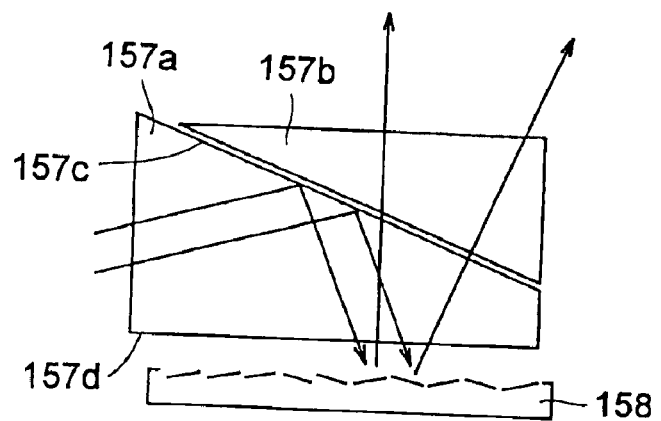
FIG. 49 is a diagram showing a conventional optical system for illuminating a DMD.

The DMD 93 is controlled in such a way as to reflect light representing an image in the perpendicular direction and reflect other light in a direction different from the perpendicular direction. These light components thus reflected in two different directions by the DMD 93 enter the optical device 21 through the surface 81a of the transparent substrate 81. These light components both strike the angle separation film 83c at a small angle of incidence, and are thus transmitted through the angle separation film 83c and then exit from the optical device 21. Out of the light that has exited from the optical device 21, only the light component representing the image enters the projection optical system 94 and is projected onto a screen (not shown). In this arrangement, it is possible to greatly reduce the back focal length of the projection optical system 94 as compared with an optical system that employs prisms as shown in FIG. 49.

Figure 42:
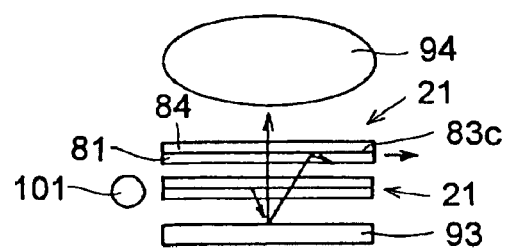
FIG. 42 is a sectional view showing a case in which the optical device of the twenty-first embodiment is used as an illumination optical system for a DMD and as an optical system for extracting light representing an image.

As shown in FIG. 42, it is also possible to provide two optical devices 21 with differently configured angle separation films 83c so that, out of the light reflected from the DMD 93 and then transmitted through one of the optical devices 21, i.e. the one serving for illumination, light other than the light representing the image is reflected from the angle separation film 83c of the other optical device 21 and is then totally reflected inside the optical device 21 so as to exit therefrom through the end surface thereof. This helps eliminate unnecessary light that travels toward the vicinity of the projection optical system 94, and thus makes it possible to further reduce the back focal length of the projection optical system 94. As shown in FIG. 39, the angle separation film 83c can be so configured as to reliably separate light components that are incident thereon at angles of incidence about 10° apart from each other. This makes the DMD 93 easy to produce, because then its individual mirror elements need only to point in one of two directions that are as small an angle as about 5° apart from each other.

The two optical devices 21 may be arranged in reverse order. Instead of using two optical devices 21, it is also possible, as in the twentieth embodiment, to build a single optical device provided with two sets of a blazed grating 82 and an angle separation film 83c and use it both to illuminate the DMD 93 and to separate the light reflected from the DMD 93.

Figure 43:
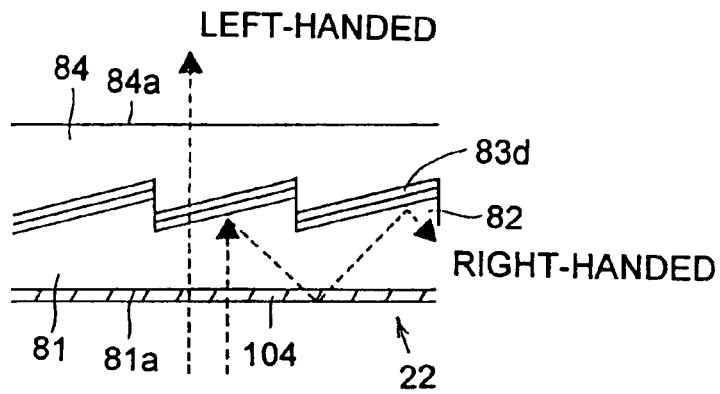
FIG. 43 is a sectional view schematically showing the structure of the optical device of a twenty-second embodiment of the invention and its action on light.

FIG. 43 schematically shows the structure of the optical device 22 of a twenty-second embodiment of the invention and its action on light. This optical device 22 is provided with, as the separation coating 83, a chiral nematic liquid crystal layer 83d that reflects one and transmits the other of two circularly polarized light components having opposite rotation directions. Moreover, the optical device 22 is pro vided with a ¼-phase plate 104 that is bonded on the surface 81a of the transparent substrate 81. In the example taken up here, the chiral nematic liquid crystal layer 83d is assumed to reflect right-handed circularly polarized light and transmit left-handed circularly polarized light.

The optical device 22 can separate two linearly polarized light components having mutually perpendicular polarization planes that enter it by passing through the ¼-phase plate 104. By passing through the ¼-phase plate 104, one of the two linearly polarized light components is formed into left-handed circularly polarized light and the other is formed into right-handed circularly polarized light. The left-handed circularly polarized light is transmitted through the chiral nematic liquid crystal layer 83d, and then exits from the optical device 22 through the surface 84a of the transparent member 84.

On the other hand, the right-handed circularly polarized light is reflected from the chiral nematic liquid crystal layer 83d, is then diffracted by the blazed grating 82, and then passes through the ¼-phase plate 104 again and is thereby formed into linearly polarized light. This linearly polarized light is totally reflected from the surface of the ¼-phase plate 104, then passes through the ¼-phase plate 104 again and is thereby formed back into right-handed circularly polarized light, and then enters the transparent substrate 81 again. This right-handed circularly polarized light, by being reflected from the chiral nematic liquid crystal layer 83d and totally reflected from the surface of the ¼-phase plate 104 in similar manners, eventually reaches the end surface of the optical device 22 and exits from the optical device 22 through the end surface.

Figure 44:
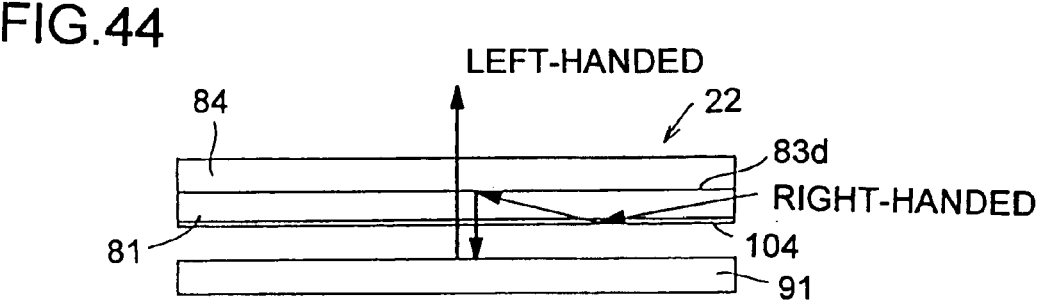
FIG. 44 is a sectional view showing a case in which the optical device of the twenty-second embodiment is used as an illumination optical system for a reflective LCD.
Figure 45:
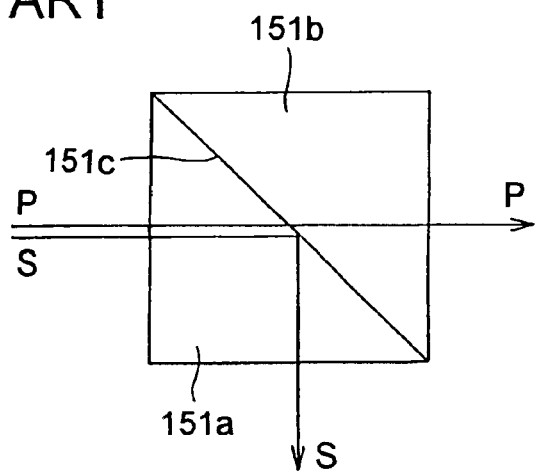
FIG. 45 is a diagram showing the structure of a PBS prism.
Figure 46:
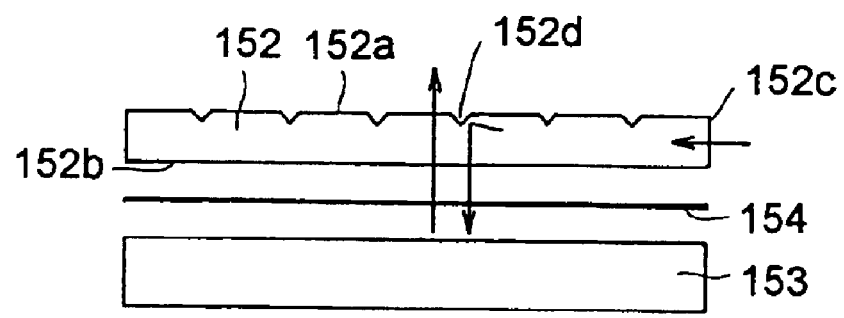
FIG. 46 is a diagram showing a conventional optical device for separating the light with which a reflective LCD is illuminated and the light reflected from the LCD.

FIG. 44 shows a case in which the optical device 22 is used as an illumination optical system for a reflective LCD. The optical device 22 is arranged parallel to the LCD 91, and right-handed circularly polarized light is introduced into the optical device 22 through the end surface thereof. This circularly polarized light, by being reflected as described above, travels inside the optical device 22. Meanwhile, the light is reflected from the liquid crystal layer 83d and has its angle of incidence relative to the surface of the ¼-phase plate 104 changed gradually, until, when the angle of incidence becomes smaller than the critical angle, it exits from the optical device 22 as illumination light for the LCD 91. This illumination light has been formed into linearly polarized light by passing through the ¼-phase plate 104.

The LCD 91 is controlled in such a way that a linearly polarized light component whose polarization plane has been rotated through 90° by modulation represents an image. The light modulated by and reflected from the LCD 91 enters the optical device 22, and is formed into circularly polarized light by the ¼-phase plate 104. Here, the linearly polarized light component whose polarization has been rotated by modulation, i.e. the light that represents the image, is formed into left-handed circularly polarized light, and the linearly polarized light component whose polarization has not been rotated is formed back into right-handed circularly polarized light. These two circularly polarized light components then reach the chiral nematic liquid crystal layer 83d, and only the left-handed circularly polarized light component, representing the image, is transmitted through the liquid crystal layer 83d. On the other hand, the right-handed circularly polarized light component is reflected from the liquid crystal layer 83d, and then exits from the optical device 22 through the end surface thereof. In this way, only the light representing the image is extracted.

In the embodiments described above, the blazed grating 82 is so designed as to simply diffract light; however, it may also be given an optical power. This can be achieved by, instead of giving the blazed grating 82a structure that is periodic all over, giving it a structure with varying periodicity and structural units from one portion thereof to the next so as to obtain continuously varying diffraction angles. It is also possible to provide, instead of the blazed grating 82, a bi-level or multi-level diffraction grating and provide a separation coating 83 on top thereof.

Obviously, many modifications and variations of the present invention are possible in light of the above teachings. It is therefore to be understood that within the scope of the appended claims, the invention may be practiced other than as specifically described.

What is claimed is:

1. A polarization separation device comprising:

a first transparent substrate that is optically substantially isotropic;

a diffractive optical element layer disposed contiguously with the first substrate and having a diffraction grating surface on a side thereof opposite to a surface thereof contiguous with the first substrate; and an optically anisotropic layer formed out of an optically anisotropic birefringent material and disposed contiguously with the diffraction grating surface, wherein the diffractive optical element layer is 10 to 200 μm thick.

2. A polarization separation device as claimed in claim 1, wherein the diffractive optical element layer is made of a thermoplastic resin.

3. A polarization separation device as claimed in claim 1, wherein the diffraction grating surface has a blazed grating, and fulfills conditional formulae (1), (2), and (3) or (4) below:

$$1.5 < H < 6 \qquad (1)$$

$$0.1 < \Delta n < 0.3 \qquad (2)$$

$$np \approx no \qquad (3)$$

$$np \approx ne \qquad (4)$$

where

H represents a diffration grating height (μm);

Δn represents whichever refractive index difference |np−no| or |np−ne| is greater;

np represents a refractive index of the diffractive optical element layer;

no represents a refractive index for ordinary light of the optically anisotropic layer; and ne represents a refractive index for extraordinary light of the optically anisotropic layer.

4. A polarization separation device as claimed in claim 1, further comprising:

a second transparent substrate disposed contiguously with the optically anisotropic layer in such a way that the optically anisotropic layer is sandwiched between the second transparent substrate and the diffractive optical element layer, wherein the optically anisotropic layer is made of nematic or smectic liquid crystal, and wherein, on a surface of the second transparent substrate that faces the optically anisotropic layer, an orientation film is provided that has been subjected to a rubbing process so that molecules of the liquid crystal are oriented homogeneously along grooves of the diffraction grating surface.

5. A polarization separation device as claimed in claim 4, wherein the diffractive optical element layer, the first transparent substrate, and the second transparent substrate are fitted together with a sealant.

6. A polarization separation device as claimed in claim 1, wherein the diffractive optical element layer is bonded to the first transparent substrate with an adhesive.

7. A polarization separation device as claimed in claim 1, wherein the diffractive optical element layer is made of a UV-curing resin.

* * * * *

UNITED STATES PATENT AND TRADEMARK OFFICE
CERTIFICATE OF CORRECTION

PATENT NO. : 7,075,615 B2
APPLICATION NO. : 10/845421
DATED : July 11, 2006
INVENTOR(S) : Jun Ishihara and Kohtaro Hayashi It is certified that error appears in the above-identified patent and that said Letters Patent is hereby corrected as shown below:

Title Page: Item
(75) Inventors: delete "Yuichiro Ori, Moriyama (JP)".

Signed and Sealed this

Twenty-fourth Day of April, 2007

JON W. DUDAS
*Director of the United States Patent and Trademark Office*